US012689753B2

(12) United States Patent　　(10) Patent No.: US 12,689,753 B2
Malhotra et al.　　(45) Date of Patent: *Jul. 21, 2026

(54) VIRTUAL FILE SYSTEM FOR CLOUD-BASED SHARED CONTENT

(71) Applicant: Box, Inc., Redwood City, CA (US)

(72) Inventors: Ritik Malhotra, San Jose, CA (US);
Tanooj Tanooj, San Diego, CA (US);
Sri Sarat Ravikumar Tallamraju,
Carmichael, CA (US)

(73) Assignee: Box, Inc., Redwood City, CA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/323,891

(22) Filed: May 25, 2023

(65) Prior Publication Data

US 2023/0385246 A1　　Nov. 30, 2023

Related U.S. Application Data

(63) Continuation of application No. 17/195,596, filed on
Mar. 8, 2021, now Pat. No. 11,663,168, which is a
(Continued)

(51) Int. Cl.
*H04N 19/40*　　(2014.01)
*G06F 9/46*　　(2006.01)
(Continued)

(52) U.S. Cl.
CPC ............... *H04N 19/40* (2014.11); *G06F 9/46*
(2013.01); *G06F 12/0891* (2013.01);
(Continued)

(58) Field of Classification Search
None
See application file for complete search history.

(56) References Cited

U.S. PATENT DOCUMENTS 4,774,654 A　9/1988　Pomerene et al.
6,512,529 B1　1/2003　Janssen
(Continued)

OTHER PUBLICATIONS

Non-Final Office Action for U.S. Appl. No. 16/174,202 dated Jun.
30, 2020.
(Continued)

*Primary Examiner* — Jau Shya Meng
(74) *Attorney, Agent, or Firm* — Vista IP Law Group,
LLP

(57) ABSTRACT

A server in a cloud-based environment interfaces with
storage devices that store shared content accessible by two
or more users. Individual items within the shared content are
associated with respective object metadata that is also stored
in the cloud-based environment. Download requests initiate
downloads of instances of a virtual file system module to
two or more user devices associated with two or more users.
The downloaded virtual file system modules capture local
metadata that pertains to local object operations directed by
the users over the shared content. Changed object metadata
attributes are delivered to the server and to other user
devices that are accessing the shared content. Peer-to-peer
connections can be established between the two or more user
devices. Object can be divided into smaller portions such
that processing the individual smaller portions of a larger
object reduces the likelihood of a conflict between user
operations over the shared content.

20 Claims, 22 Drawing Sheets

13A00

A computer processor to execute a set of program code instructions　—13A10

13A05

Program code for configuring a server in a cloud-based environment
to interface with one or more storage devices that store shared
content accessible by two or more users, the shared content
associated with object metadata stored in the cloud-based
environment　—13A20

Program code for delivering a virtual file system module to two or
more user devices associated with the two or more users for
accessing the shared content, the virtual file system module serving
to capture local metadata that pertains to at least one object from
the shared content　—13A30

Program code for updating one or more local metadata attributes of
the local metadata responsive to at least one local object operation
invoked by at least one first user device from the user devices　—13A40

Program code for updating, in response to the local object
operation, one or more object metadata attributes of the object
metadata　—13A50

Program code for delivering at least one of the one or more object
metadata attributes to at least one second user device from the user
devices　—13A60

Related U.S. Application Data continuation of application No. 16/174,202, filed on Oct. 29, 2018, now Pat. No. 10,942,899, which is a continuation of application No. 15/140,179, filed on Apr. 27, 2016, now Pat. No. 10,114,835.

(60) Provisional application No. 62/154,658, filed on Apr. 29, 2015.

(51) Int. Cl.

| | |
|---|---|
| *G06F 12/0891* | (2016.01) |
| *G06F 12/1081* | (2016.01) |
| *G06F 12/122* | (2016.01) |
| *G06F 16/11* | (2019.01) |
| *G06F 16/17* | (2019.01) |
| *G06F 16/172* | (2019.01) |
| *G06F 16/174* | (2019.01) |
| *G06F 16/176* | (2019.01) |
| *G06F 16/182* | (2019.01) |
| *G06F 16/185* | (2019.01) |
| *G06F 16/188* | (2019.01) |
| *G06F 16/22* | (2019.01) |
| *G06F 16/23* | (2019.01) |
| *G06F 16/242* | (2019.01) |
| *G06F 16/957* | (2019.01) |
| *H04L 9/40* | (2022.01) |
| *H04L 65/70* | (2022.01) |
| *H04L 65/75* | (2022.01) |
| *H04L 65/80* | (2022.01) |
| *H04L 67/00* | (2022.01) |
| *H04L 67/06* | (2022.01) |
| *H04L 67/1097* | (2022.01) |

(52) U.S. Cl.
CPC ........ *G06F 12/1081* (2013.01); *G06F 12/122* (2013.01); *G06F 16/113* (2019.01); *G06F 16/172* (2019.01); *G06F 16/1727* (2019.01); *G06F 16/1748* (2019.01); *G06F 16/1774* (2019.01); *G06F 16/182* (2019.01); *G06F 16/183* (2019.01); *G06F 16/185* (2019.01); *G06F 16/188* (2019.01); *G06F 16/196* (2019.01); *G06F 16/22* (2019.01); *G06F 16/23* (2019.01); *G06F 16/2443* (2019.01); *G06F 16/9574* (2019.01); *H04L 63/0428* (2013.01); *H04L 65/70* (2022.05); *H04L 65/762* (2022.05); *H04L 65/80* (2013.01); *H04L 67/06* (2013.01); *H04L 67/1097* (2013.01); *H04L 67/34* (2013.01); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(56) References Cited

U.S. PATENT DOCUMENTS

| | | | |
|---|---|---|---|
| 6,750,858 B1 | 6/2004 | Rosenstein | |
| 7,047,309 B2 | 5/2006 | Baumann | |
| 7,281,168 B1 | 10/2007 | Coates | |
| 7,404,000 B2 | 7/2008 | Lolayekar | |
| 7,694,065 B2 | 4/2010 | Petev | |
| 7,975,018 B2 | 7/2011 | Unrau | |
| 8,180,801 B2 | 5/2012 | Zhang | |
| 8,423,606 B1 | 4/2013 | Streeter | |
| 8,489,549 B2 | 7/2013 | Guarraci | |
| 8,527,549 B2 | 9/2013 | Cidon | |
| 8,548,957 B2 | 10/2013 | Guarraci | |
| 8,634,456 B2 | 1/2014 | Chen | |
| 8,826,332 B2 | 9/2014 | Marshall | |
| 8,849,761 B2 | 9/2014 | Prahlad | |
| 8,886,704 B2 | 11/2014 | Busey | |
| 8,886,894 B2 | 11/2014 | Adi-Tabatabai | |
| 8,948,258 B2 | 2/2015 | Chen | |
| 8,954,596 B2 | 2/2015 | Ronca | |
| 9,015,470 B2 | 4/2015 | Losev | |
| 9,087,066 B2 | 7/2015 | Acharya | |
| 9,191,725 B2 | 11/2015 | Schmidt | |
| 9,210,085 B2 | 12/2015 | Harrison | |
| 9,253,166 B2 | 2/2016 | Gauda | |
| 9,288,510 B1 | 3/2016 | Yang | |
| 9,294,530 B2 | 3/2016 | McCormick | |
| 9,307,258 B2 | 4/2016 | Macinnis | |
| 9,313,510 B2 | 4/2016 | Shivadas | |
| 9,319,678 B2 | 4/2016 | Coudurier | |
| 9,332,050 B2 | 5/2016 | Collard | |
| 9,384,209 B2 | 7/2016 | Kim | |
| 9,392,304 B2 | 7/2016 | Coudurier | |
| 9,432,704 B2 | 8/2016 | Mutton | |
| 9,444,695 B2 | 9/2016 | Dutta | |
| 9,501,212 B2 | 11/2016 | Marshall | |
| 9,544,348 B2 | 1/2017 | Devereaux | |
| 9,621,613 B1 | 4/2017 | Huang | |
| 9,628,268 B2 | 4/2017 | Kiang et al. | |
| 9,632,814 B2 | 4/2017 | Bonilla | |
| 9,715,428 B1 | 7/2017 | Morshed | |
| 9,756,022 B2 | 9/2017 | Amiri et al. | |
| 9,788,015 B2 | 10/2017 | Chen | |
| 9,811,532 B2 | 11/2017 | Parkison et al. | |
| 9,852,361 B1 | 12/2017 | Prasad | |
| 9,900,608 B2 | 2/2018 | Coudurier | |
| 9,930,365 B2 | 3/2018 | Chen | |
| 9,940,241 B1 | 4/2018 | Mehrotra | |
| 9,973,564 B2 | 5/2018 | Dong | |
| 10,033,787 B2 | 7/2018 | Ronca | |
| 10,044,466 B2 | 8/2018 | Schmidt et al. | |
| 10,063,872 B2 | 8/2018 | Coward | |
| 10,097,607 B2 | 10/2018 | Wu et al. | |
| 10,180,947 B2 | 1/2019 | Malhotra et al. | |
| 10,469,554 B2 | 11/2019 | Brueck et al. | |
| 10,929,353 B2 | 2/2021 | Luthra et al. | |
| 11,184,652 B2 | 11/2021 | Gogoi et al. | |
| 11,470,131 B2 | 10/2022 | Karande et al. | |
| 2004/0100937 A1 | 5/2004 | Chen | |
| 2004/0107319 A1 | 6/2004 | D'Orto | |
| 2006/0059509 A1 | 3/2006 | Huang | |
| 2007/0076626 A1 | 4/2007 | Wise | |
| 2007/0250476 A1 | 10/2007 | Krasnik | |
| 2008/0098237 A1 | 4/2008 | Dung | |
| 2008/0222244 A1 | 9/2008 | Huang et al. | |
| 2008/0267221 A1 | 10/2008 | Ozzie | |
| 2009/0016445 A1 | 1/2009 | Gao | |
| 2009/0310669 A1 | 12/2009 | Konoshima | |
| 2010/0070608 A1 | 3/2010 | Hosur | |
| 2010/0211690 A1 | 8/2010 | Pakzad | |
| 2010/0250867 A1 | 9/2010 | Bettger et al. | |
| 2010/0268840 A1 | 10/2010 | Hiie | |
| 2010/0332479 A1 | 12/2010 | Prahlad | |
| 2011/0066668 A1 | 3/2011 | Guarraci | |
| 2011/0096828 A1 | 4/2011 | Chen | |
| 2011/0179167 A1 | 7/2011 | Tanimoto | |
| 2011/0185292 A1 | 7/2011 | Chawla | |
| 2011/0194613 A1 | 8/2011 | Chen | |
| 2011/0231519 A1 | 9/2011 | Luby | |
| 2011/0231569 A1 | 9/2011 | Luby | |
| 2011/0238789 A1 | 9/2011 | Luby | |
| 2011/0239078 A1 | 9/2011 | Luby | |
| 2011/0246616 A1 | 10/2011 | Ronca | |
| 2011/0305273 A1 | 12/2011 | He | |
| 2011/0320733 A1 | 12/2011 | Sanford | |
| 2012/0016838 A1 | 1/2012 | Arai et al. | |
| 2012/0023249 A1 | 1/2012 | Chen | |
| 2012/0158802 A1 | 6/2012 | Lakshmanan | |
| 2012/0278497 A1 | 11/2012 | Hsu | |
| 2012/0331089 A1 | 12/2012 | Vonog | |
| 2013/0013803 A1 | 1/2013 | Bichot | |
| 2013/0047084 A1* | 2/2013 | Sanders | G06F 16/4387 715/716 |

(56) References Cited

U.S. PATENT DOCUMENTS

| | | | |
|---|---|---|---|
| 2013/0110961 A1 | 5/2013 | Jadhav | |
| 2013/0117418 A1 | 5/2013 | Mutton | |
| 2013/0138810 A1 | 5/2013 | Binyamin | |
| 2013/0223509 A1 | 8/2013 | Tweedale | |
| 2013/0238785 A1 | 9/2013 | Hawk | |
| 2013/0276048 A1 | 10/2013 | Krasic | |
| 2013/0318198 A1 | 11/2013 | Zuk et al. | |
| 2013/0339470 A1 | 12/2013 | Jeswani | |
| 2014/0006354 A1 | 1/2014 | Parkison et al. | |
| 2014/0006465 A1 | 1/2014 | Davis et al. | |
| 2014/0007239 A1* | 1/2014 | Sharpe | G06F 16/183 |
| | | | 726/24 |
| 2014/0019844 A1 | 1/2014 | Rakow | |
| 2014/0108792 A1 | 4/2014 | Borzycki et al. | |
| 2014/0118379 A1 | 5/2014 | Hakura | |
| 2014/0119457 A1 | 5/2014 | Macinnis | |
| 2014/0140417 A1 | 5/2014 | Shaffer | |
| 2014/0149591 A1 | 5/2014 | Bhattacharya | |
| 2014/0149783 A1 | 5/2014 | Georgiev | |
| 2014/0153909 A1 | 6/2014 | Macinnis | |
| 2014/0177733 A1 | 6/2014 | Coudurier | |
| 2014/0181864 A1 | 6/2014 | Marshall | |
| 2014/0201141 A1 | 7/2014 | Vibhor et al. | |
| 2014/0269932 A1 | 9/2014 | Su | |
| 2014/0281009 A1 | 9/2014 | Moorthy | |
| 2014/0282771 A1 | 9/2014 | Tumuluru | |
| 2014/0297586 A1* | 10/2014 | Kim | G06F 16/1827 |
| | | | 707/610 |
| 2014/0324929 A1 | 10/2014 | Mason, Jr. | |
| 2014/0351455 A1 | 11/2014 | McCormick | |
| 2014/0359465 A1 | 12/2014 | Litan Sever et al. | |
| 2014/0379647 A1 | 12/2014 | Smith | |
| 2014/0380376 A1 | 12/2014 | Schmidt | |
| 2015/0039726 A1 | 2/2015 | Hoffert | |
| 2015/0067109 A1 | 3/2015 | Tang et al. | |
| 2015/0067753 A1 | 3/2015 | Shemesh | |
| 2015/0098690 A1 | 4/2015 | Abbate | |
| 2015/0120675 A1 | 4/2015 | Mason, Jr. et al. | |
| 2015/0220561 A1 | 8/2015 | Goetz | |
| 2015/0227602 A1 | 8/2015 | Ramu | |
| 2015/0242436 A1 | 8/2015 | Bodin | |
| 2015/0372939 A1 | 12/2015 | Redler, IV | |
| 2016/0014095 A1 | 1/2016 | Strayer | |
| 2016/0041777 A1* | 2/2016 | Tripathy | G06F 16/1752 |
| | | | 711/126 |
| 2016/0065364 A1 | 3/2016 | Amiri et al. | |
| 2016/0103851 A1 | 4/2016 | Dimitrov | |
| 2016/0119657 A1 | 4/2016 | Sun | |
| 2016/0134673 A1 | 5/2016 | Macinnis | |
| 2016/0156948 A1 | 6/2016 | Yang | |
| 2016/0173900 A1 | 6/2016 | Lee | |
| 2016/0212440 A1 | 7/2016 | Coudurier | |
| 2016/0234282 A1 | 8/2016 | Lederer | |
| 2016/0241898 A1 | 8/2016 | Korz | |
| 2016/0321287 A1 | 11/2016 | Luthra et al. | |
| 2016/0321288 A1 | 11/2016 | Malhotra et al. | |
| 2016/0321291 A1 | 11/2016 | Malhotra et al. | |
| 2016/0321311 A1 | 11/2016 | Tallamraju et al. | |
| 2016/0323351 A1 | 11/2016 | Luthra et al. | |
| 2016/0323358 A1 | 11/2016 | Malhotra et al. | |
| 2017/0017665 A1* | 1/2017 | Savenok | G06F 16/178 |
| 2017/0134344 A1 | 5/2017 | Wu | |
| 2017/0141921 A1 | 5/2017 | Berger | |
| 2018/0098083 A1 | 4/2018 | Mcallister | |

OTHER PUBLICATIONS

Notice of Allowance for U.S. Appl. No. 16/174,202 dated Oct. 21, 2020.

"Data deduplication", Wikipedia, URL: https://en.wikipedia.org/wiki/Data_deduplication, Mar. 6, 2016, Accessed on Apr. 10, 2016.

"REST Docs | Bitcasa Developer Center", URL: https://developer.bitcasa.com/docs/rest/, Sep. 2015, Accessed on Jan. 15, 2016.

Apache Thrift Wikipedia, URL: https://en.wikipedia.org/wiki/Apache_Thrift, Oct. 27, 2015, Accessed on Jan. 26, 2016.

Chiu, David, et al., "Elastic Cloud Caches for Accelerating Service-Oriented Computations", SC '10, New Orleans, LA, Nov. 13-19, 2010, 11 pages.

Chun, Byung-Gon, et al., "CloneCloud: Elastic Execution between Mobile Device and Cloud", EuroSys '11, Salzburg, Austria, Apr. 10-13, 2011, pp. 301-314.

Final Office Action dated Feb. 6, 2019 for U.S. Appl. No. 15/140,357.

Final Office Action dated Mar. 20, 2020 for U.S. Appl. No. 15/140,292.

Final Office Action dated Jun. 30, 2020 for U.S. Appl. No. 15/140,357.

Final Office Action dated Aug. 1, 2018 for U.S. Appl. No. 15/140,292.

Final Office Action dated Oct. 9, 2020 for U.S. Appl. No. 15/140,357.

Final Office Action dated Oct. 30, 2018 for U.S. Appl. No. 15/140,270.

Haining, Theodore R., et al., "Management Policies for Non-Volatile Write Caches", PCCC 1999, Scottsdale, AZ, Feb. 12, 1999, pp. 321-328.

Juve, Gideon, and Ewa Deelman. "Automating application deployment in infrastructure clouds." *2011 IEEE Third International Conference on Cloud Computing Technology and Science.* IEEE, 2011.

Kim, Hwanju, et al., "XHive: Efficient Cooperative Caching for Virtual Machines", IEEE Transactions on Computers, vol. 60, No. 1, Jan. 2011, pp. 106-119.

Kim, Hyeon Gyu, et al., "Time-slide window join over data streams", Journal of Intelligent Information Streams, vol. 43, Issue 2, Oct. 2014, pp. 323-347.

Li, Jin, et al., "AdaptWID: An Adaptive, Memory-Efficient Window Aggregation Implementation", IEEE Internet Computing, vol. 12, Issue 6, Nov.-Dec. 2008, pp. 22-29.

Li, Jin, et al., "Semantics and Evaluation Techniques for Window Aggregates in Data Streams", ACM SIGMOD 2005, Baltimore, MD, Jun. 14-16, 2005, pp. 311-322.

Mancuso, Renato, et al., "Real-Time Cache Management Framework for Multi-core Architectures", RTAS 2013, Philadelphia, PA, Apr. 9-11, 2013, pp. 45-54.

Mao, Huajian, et al., "Wukong: A cloud-oriented file service for mobile Internet devices", Journal of Parallel and Distributed Computing, vol. 72, Issue 2, Feb. 2012, pp. 171-184.

Maxim Levkov. "Understanding the MPEG-4 Movie Atom", Adobe Developer Connection, 5 pages. (Year: 2010).

Non-Final Office Action dated Feb. 5, 2020 for U.S. Appl. No. 15/140,357.

Non-Final Office Action dated Feb. 23, 2018 for U.S. Appl. No. 15/140,292.

Non-Final Office Action dated Apr. 18, 2018 for U.S. Appl. No. 15/140,310.

Non-Final Office Action dated May 14, 2018 for U.S. Appl. No. 15/140,270.

Non-Final Office Action dated Jun. 3, 2019 for U.S. Appl. No. 15/140,357.

Non-Final Office Action dated Jun. 13, 2019 for U.S. Appl. No. 15/140,292.

Non-Final Office Action dated Nov. 9, 2018 for U.S. Appl. No. 15/140,357.

Notice of Allowance dated Feb. 21, 2018 for U.S. Appl. No. 15/140,330.

Notice of Allowance dated Mar. 14, 2018 for U.S. Appl. No. 15/140,248.

Notice of Allowance dated Apr. 5, 2019 for U.S. Appl. No. 15/140,270.

Notice of Allowance dated Apr. 5, 2019 for U.S. Appl. No. 16/024,748.

Notice of Allowance dated Jun. 15, 2018 for U.S. Appl. No. 15/140,179.

Notice of Allowance dated Aug. 7, 2020 for U.S. Appl. No. 16/036,735.

Notice of Allowance dated Sep. 6, 2018 for U.S. Appl. No. 15/140,310.

Patroumpas, Kostas, et al., "Maintaining consistent results of continuous queries under diverse window specifications", Information Systems, vol. 36, Issue 1, Mar. 2011, pp. 42-61.

Notice of Allowance dated Jan. 19, 2023 for U.S. Appl. No. 17/195,596.

(56)          References Cited

OTHER PUBLICATIONS

Non-Final Office Action dated Apr. 27, 2022 for U.S. Appl. No. 17/195,596.
Final Office Action dated Sep. 12, 2022 U.S. Appl. No. 17/195,596.
Final Office Action dated Oct. 19, 2023 or U.S. Appl. No. 17/182,105.
Patroumpas, Kostas, et al., "Window Specification over Data Streams", EDBT 2006 Workshops, LNCS 4254, © IFIP International Federation for Information Processing © 2006, pp. 445-464.
Peng, Chunyi, et al., "VON: Virtual Machine Image Distribution Network for Cloud Data Centers", INFOCOM 2012, Orlando, FL, Mar. 25-30, 2012, pp. 181-189.
Saxena, Moh it, et al., "Flash Tier: A Lightweight, Consistent and Durable Storage Cache", EuroSys '12, Bern, Switzerland, Apr. 10-13, 2012, pp. 267-280.
Stefanov, Emil, et al., "Iris: A Scalable Cloud File System with Efficient Integrity Checks", ACSAC '12, Orlando, FL, Dec. 3-7, 2012, pp. 229-238.
Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.
Zhou, Yuanyuan, et al., "Second-Level Buffer Cache Management", IEEE Transactions on Parallel and Distributed Systems, vol. 15, No. 6, Jun. 2004, pp. 505-519.
Notice of Allowance dated Oct. 21, 2020 for U.S. Appl. No. 15/140,292.
Non-Final Office Action dated Apr. 6, 2022 for U.S. Appl. No. 17/182,105.
Final Office Action Dated Aug. 18, 2022 for U.S. Appl. No. 17/182,105.
Non-Final Office Action dated May 11, 2023 for U.S. Appl. No. 17/182,105.
Non-Final Office Action dates Nov. 22, 2023 for U.S. Appl. No. 18/320,907.
Notice of Allowance dated Mar. 19, 2024 for U.S. Appl. No. 18/320,907.
Non-Final Office Action dated Jun. 25, 2024 or U.S. Appl. No. 17/182,105.
Notice of Allowance dated Oct. 9, 2024 for U.S. Appl. No. 17/182,105.
Notice of Allowance dated Mar. 26, 2025, for U.S. Appl. No. 17/182,105.

* cited by examiner

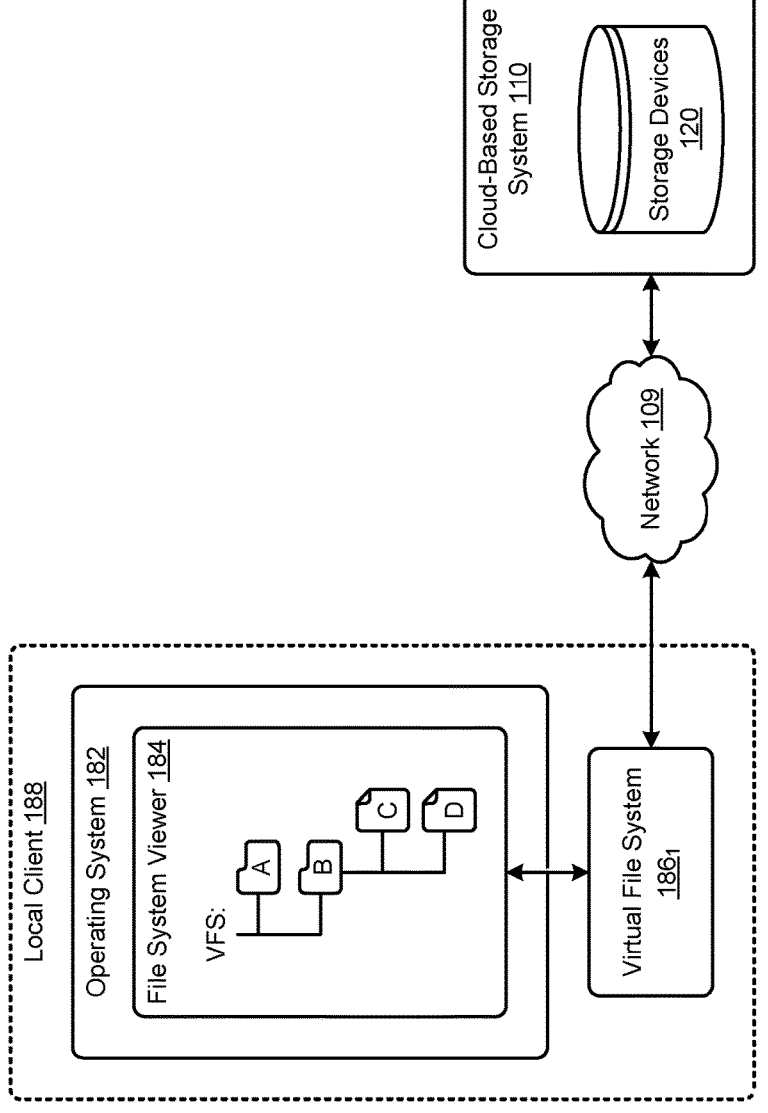
FIG. 1A1

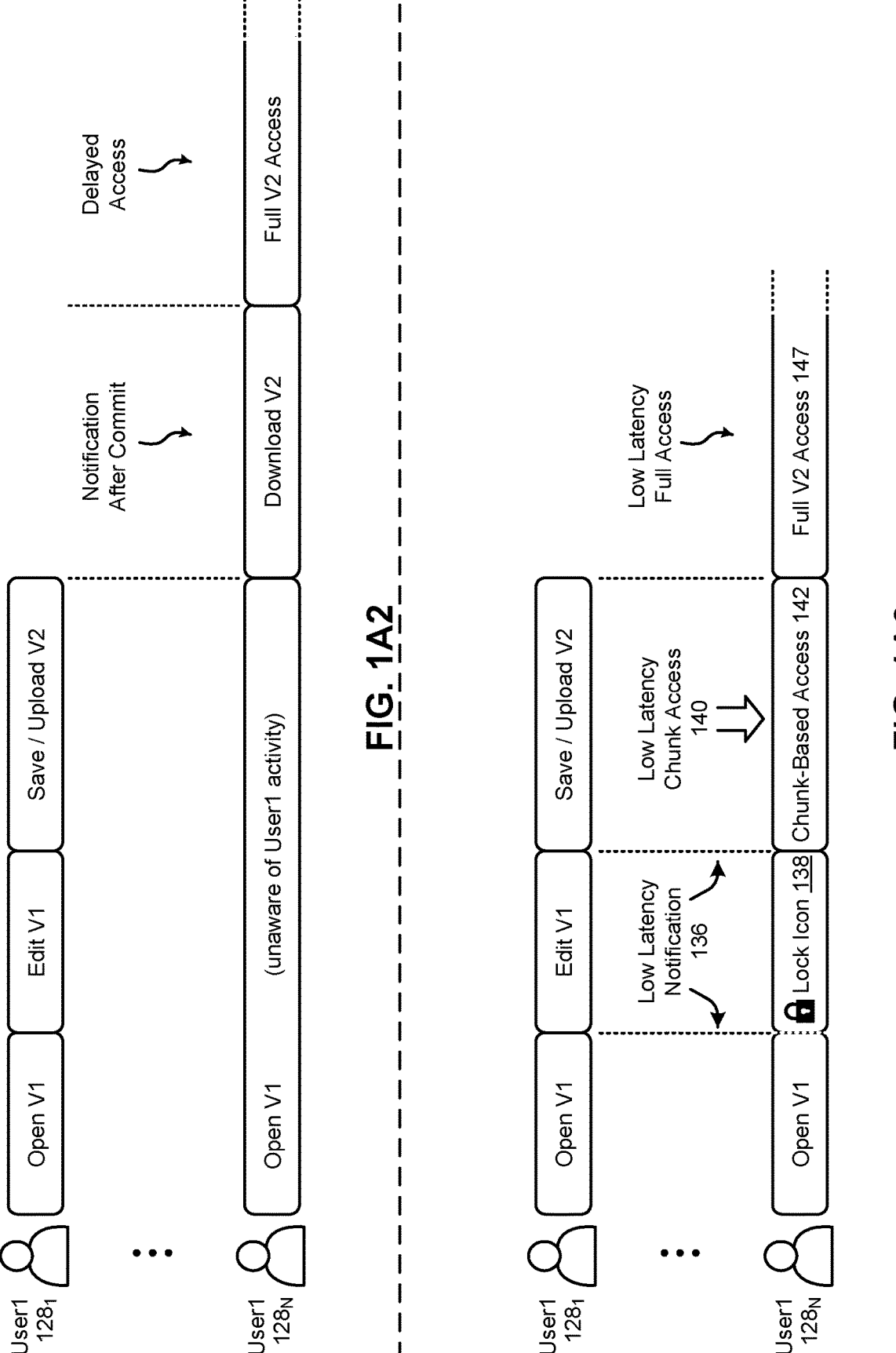
FIG. 1A2
FIG. 1A3

500

502
Receive request to change file

Without waiting for remote commit, perform local change to file 504

506
Save in local data cache

508
Change local view metadata

510
Operate with assumption of local changes

512
Upload change to remote storage system

514
Receive confirmation of commit at remote storage system

516
Change remote view metadata

518
Change local view metadata

Uninterrupted operation 522

520
Operate with confirmation of global change

FIG. 5

600

Peer-to-Peer
Connection 622

PeerA 688ₐ

File System
Viewer 184ₐ

VFS:

```
└── A
    └── C
```

Virtual File
System 186ₐ

PeerB 688ᵦ

File System
Viewer 184ᵦ

VFS:

```
└── B
    └── D
```

Virtual File
System 186ᵦ

---

602
Establish peer-to-peer
connection

604
Identify peer metadata

606
Transfer metadata from
first peer to second peer

---

PeerA 688ₐ

File System
Viewer 184ₐ

VFS:

```
├── A
│   └── C
└── B
    └── D
```

Virtual File
System 186ₐ

PeerB 688ᵦ

File System
Viewer 184ᵦ

VFS:

```
└── B
    └── D
```

Virtual File
System 186ᵦ

P2P Metadata
Transfer 624

FIG. 6

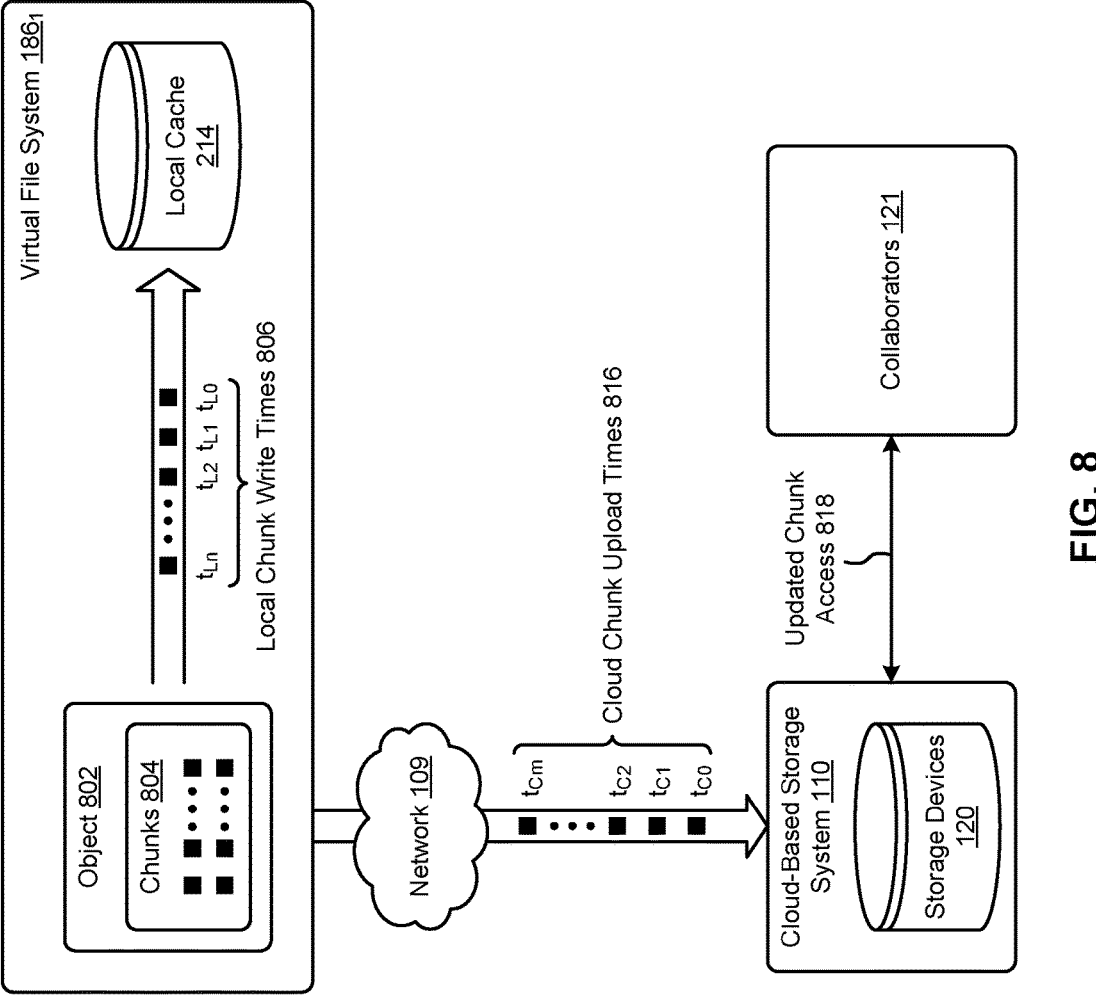
FIG. 8

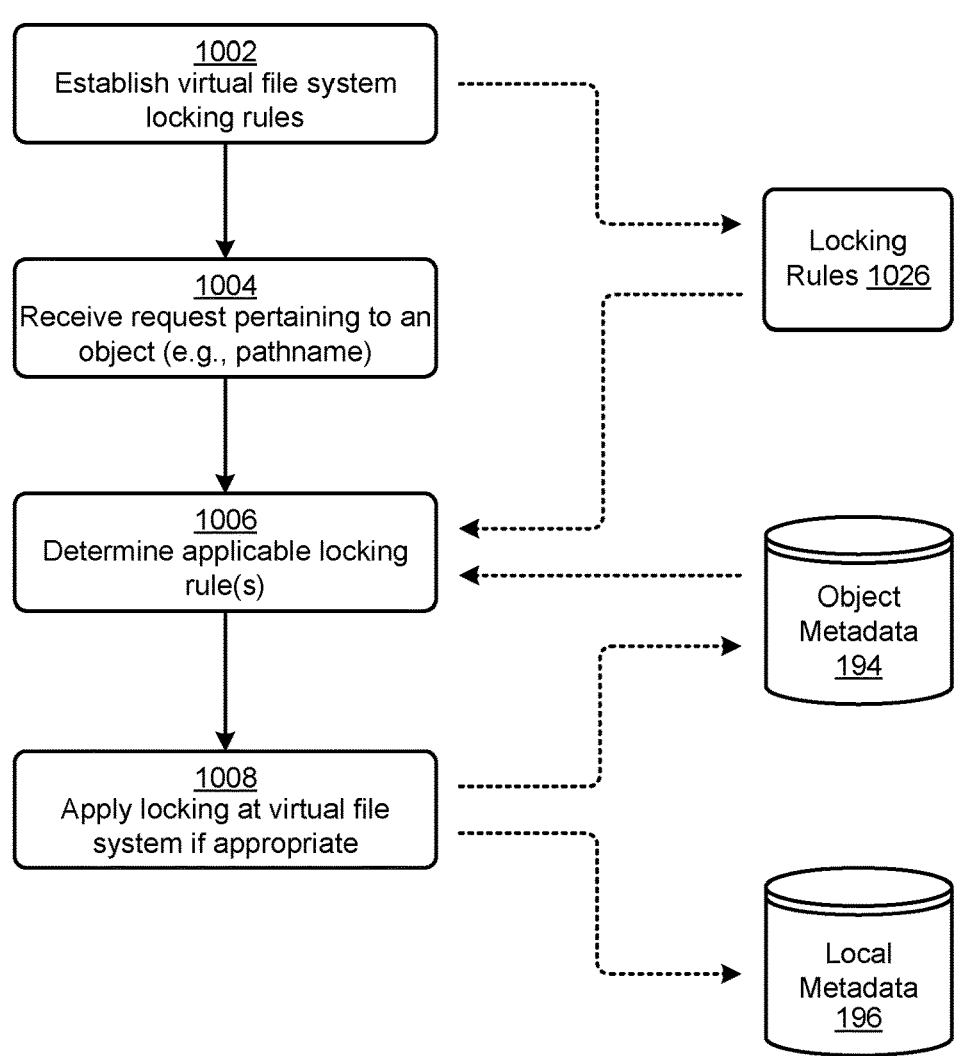
FIG. 10

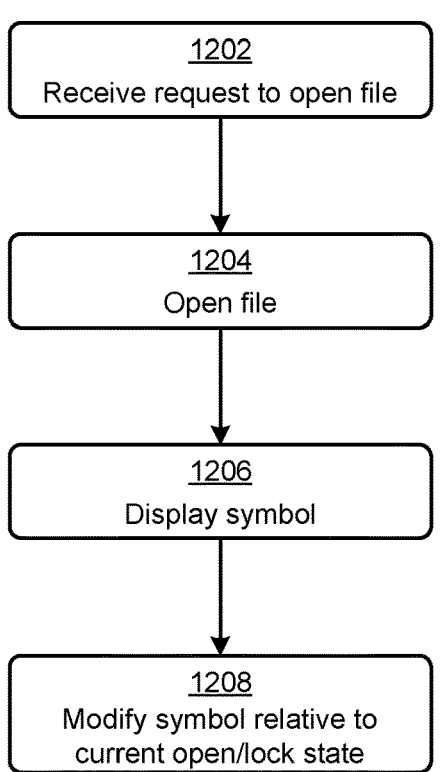
FIG. 12

13A00

13A05

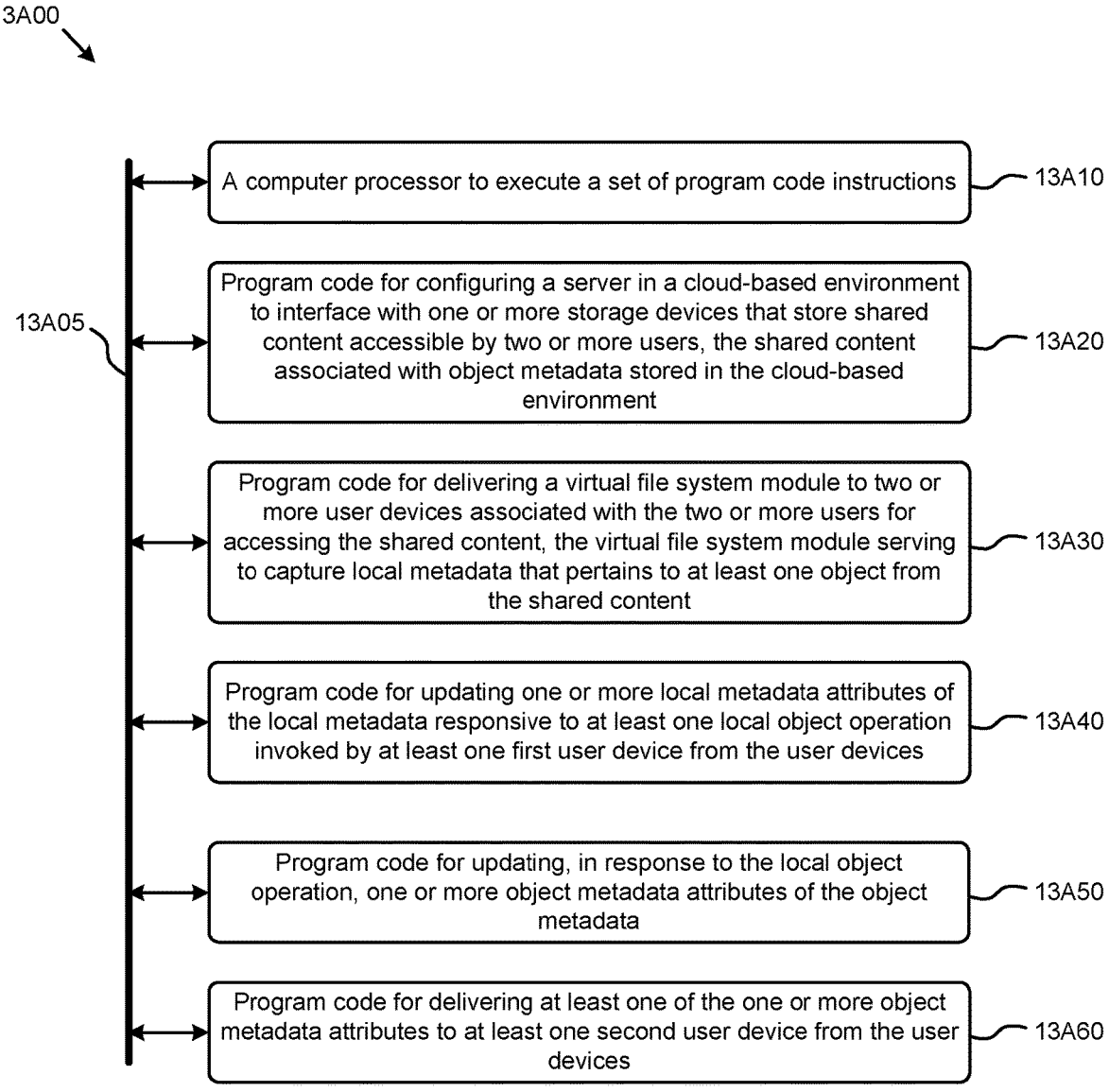

A computer processor to execute a set of program code instructions — 13A10

Program code for configuring a server in a cloud-based environment to interface with one or more storage devices that store shared content accessible by two or more users, the shared content associated with object metadata stored in the cloud-based environment — 13A20

Program code for delivering a virtual file system module to two or more user devices associated with the two or more users for accessing the shared content, the virtual file system module serving to capture local metadata that pertains to at least one object from the shared content — 13A30

Program code for updating one or more local metadata attributes of the local metadata responsive to at least one local object operation invoked by at least one first user device from the user devices — 13A40

Program code for updating, in response to the local object operation, one or more object metadata attributes of the object metadata — 13A50

Program code for delivering at least one of the one or more object metadata attributes to at least one second user device from the user devices — 13A60

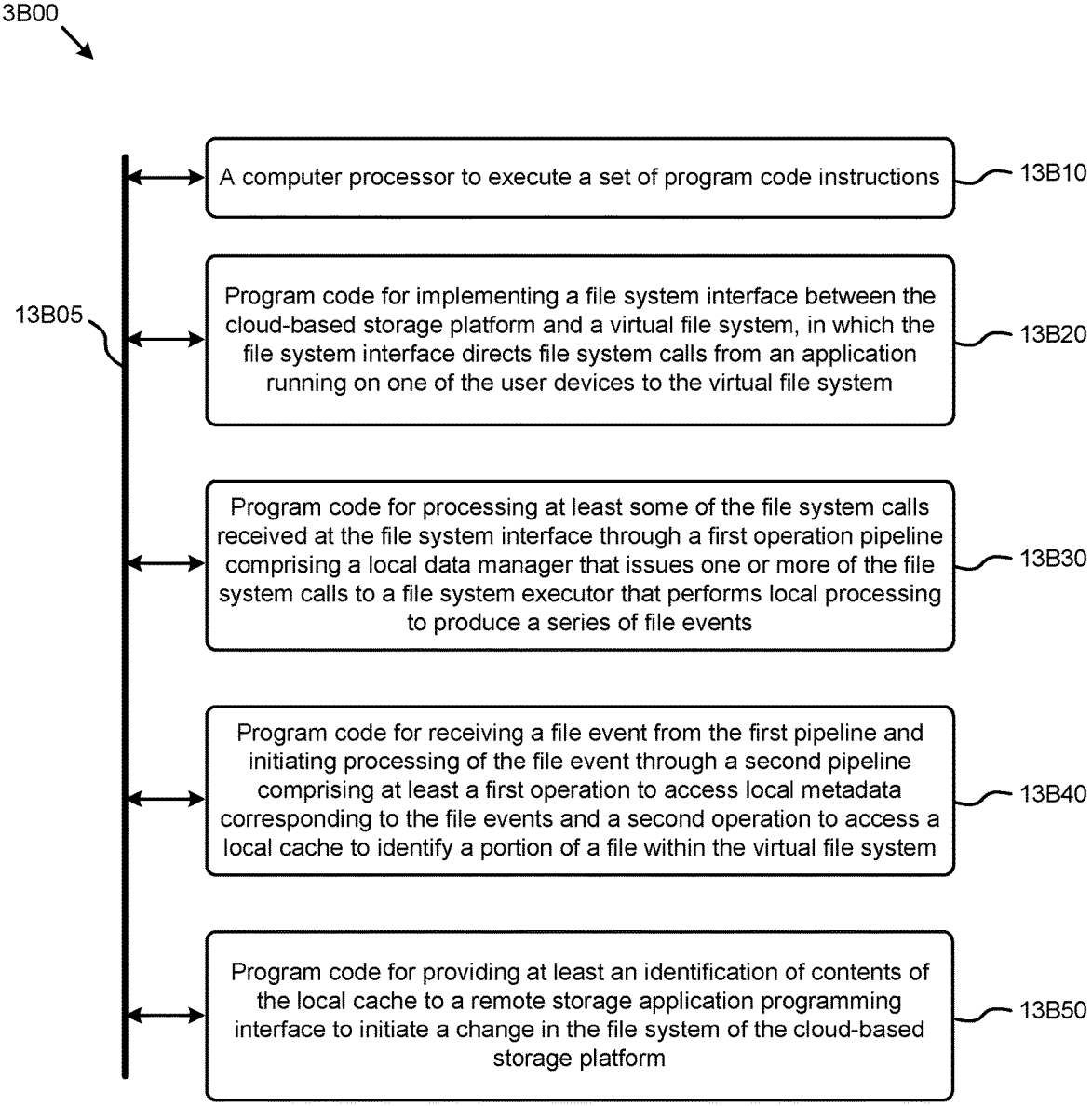

13B05

A computer processor to execute a set of program code instructions ⟋ 13B10

Program code for implementing a file system interface between the cloud-based storage platform and a virtual file system, in which the file system interface directs file system calls from an application running on one of the user devices to the virtual file system ⟋ 13B20

Program code for processing at least some of the file system calls received at the file system interface through a first operation pipeline comprising a local data manager that issues one or more of the file system calls to a file system executor that performs local processing to produce a series of file events ⟋ 13B30

Program code for receiving a file event from the first pipeline and initiating processing of the file event through a second pipeline comprising at least a first operation to access local metadata corresponding to the file events and a second operation to access a local cache to identify a portion of a file within the virtual file system ⟋ 13B40

Program code for providing at least an identification of contents of the local cache to a remote storage application programming interface to initiate a change in the file system of the cloud-based storage platform ⟋ 13B50

FIG. 13B

VIRTUAL FILE SYSTEM FOR CLOUD-BASED SHARED CONTENT

CROSS-REFERENCE TO RELATED APPLICATION(S)

The present application is a continuation of U.S. application Ser. No. 17/195,596, filed on Mar. 8, 2021, titled "VIRTUAL FILE SYSTEM FOR CLOUD-BASED SHARED CONTENT", which is a continuation of U.S. application Ser. No. 16/174,202, filed on Oct. 29, 2018, issued on Mar. 9, 2021 as U.S. Pat. No. 10,942,899, titled "VIRTUAL FILE SYSTEM FOR CLOUD-BASED SHARED CONTENT", which is a continuation of U.S. application Ser. No. 15/140,179, filed on Apr. 27, 2016, issued on Oct. 30, 2018 as U.S. Pat. No. 10,114,835, titled "VIRTUAL FILE SYSTEM FOR CLOUD-BASED SHARED CONTENT", which claims the benefit of priority to U.S. Provisional Patent Application No. 62/154,658, filed Apr. 29, 2015, titled "METHOD MECHANISM TO IMPLEMENT A VIRTUAL FILE SYSTEM FROM REMOTE CLOUD STORAGE", which are hereby incorporated by reference in their entirety The present application is related to U.S. patent application Ser. No. 15/140,248, titled "OPERATION MAPPING IN A VIRTUAL FILE SYSTEM FOR CLOUD-BASED SHARED CONTENT" filed on Apr. 27, 2016; and the present application is related to co-pending U.S. patent application Ser. No. 15/140,270, titled "MULTI-REGIME CACHING IN A VIRTUAL FILE SYSTEM FOR CLOUD-BASED SHARED CONTENT" filed on Apr. 27, 2016; and the present application is related to U.S. patent application Ser. No. 15/140,292, titled "FILE TREE STREAMING IN A VIRTUAL FILE SYSTEM FOR CLOUD-BASED SHARED CONTENT" filed on Apr. 27, 2016; and the present application is related to U.S. patent application Ser. No. 15/140,310, titled "FILE-AGNOSTIC DATA DOWNLOADING IN A VIRTUAL FILE SYSTEM FOR CLOUD-BASED SHARED CONTENT" filed on Apr. 27, 2016; and the present application is related to U.S. patent application Ser. No. 15/140,330, titled "SECURE CLOUD-BASED SHARED CONTENT" filed on Apr. 27, 2016; all of which are hereby incorporated by reference in their entirety.

FIELD

This disclosure relates to managing content in a cloud-based service platform, and more particularly to techniques for a virtual file system used with a cloud-based service platform.

BACKGROUND

The proliferation of cloud-based services have impacted the way personal and corporate electronically stored information objects (e.g., files, images, videos, etc.) are stored, and has also impacted the way such personal and corporate content is shared and managed. One benefit of using such cloud-based platforms is the ability to securely share large volumes of content among trusted collaborators over a variety of user devices such as mobile phones, tablets, laptop computers, desktop computers, and/or other devices. A large enterprise with thousands of users (e.g., employees) and many terabytes of content might use a cloud-based content storage platform to efficiently and securely facilitate content access to various individual users and/or collaborative groups of users. In such cases, a user can access a large volume of objects stored in the cloud-based platform from a user device that might store merely a small portion of that volume locally. Further, multiple users (e.g., collaborators) can access certain shared objects for various collaborative purposes (e.g., co-development, audience presentation, etc.).

Unfortunately, legacy techniques for managing remote cloud-based content on a local user device are limited at least as pertains aspects of access latency, versioning, collaboration efficiency, and/or other factors. Some legacy approaches rely on specialized user interfaces and/or application programming interfaces (APIs) to access cloud-based content from a user device. For example, such user interfaces and/or APIs might be presented in a browser to facilitate a user to navigate through the cloud-based objects (e.g., files) to access and/or operate upon the objects.

Such legacy approaches might merely enable a user to download one or more objects from the cloud-based storage to the local storage and file system native to the operating system (OS) of the user device. The user might then use the native file system to manipulate the objects using various applications on the user device. In such cases, however, the user can experience a significant access latency (e.g., delay before performing operation on a file) corresponding to the download of certain large objects. Further, the storage limitations of the user device might limit the number of objects that can be concurrently managed locally. In some cases, the objects downloaded to local memory use user device resources, usage of which device resources often detract from the performance of the user device. With some legacy approaches, collaborators associated with a certain shared object might not be notified of local operations (e.g., editing) on the shared object among other collaborators until an entire edited object has been uploaded from a user device and committed to the cloud-based storage. In other cases, certain collaborators might be locked out from any access (e.g., viewing) to a shared object when the object is being accessed by another collaborator. Such issues with legacy approaches can impact collaboration efficiency and/or effectiveness.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for a virtual file system (VFS) for cloud-based shared content, which techniques advance the relevant technologies to address technological issues with legacy approaches. More specifically, the present disclosure provides a detailed description of techniques used in systems, methods, and in computer program products for a virtual file system for cloud-based shared content. Certain embodiments are directed to technological solutions for implementing a virtual file system (VFS) using distributed metadata to facilitate low latency signaling of asynchronous cloud-based content management operations among collaborators, which embodiments advance the relevant technical fields as well as advancing peripheral technical fields.

The disclosed embodiments modify and improve over legacy approaches. In particular, the herein-disclosed techniques provide technical solutions that address the technical problems attendant to enabling multiple collaborators using resource-limited local user devices to efficiently access large volumes of shared content stored on a remote cloud-based storage platform. Such technical solutions serve to reduce the demand for computer memory, including computer storage space, reduce the demand for computer processing power, and reduce the demand for inter-component communication, including network bandwidth. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 presents a logical system view of a virtual file system for cloud-based shared content, according to some embodiments.

FIG. 1A2 and FIG. 1A3 present views for comparison of user operations and notifications as experienced by users when accessing cloud-based shared content.

FIG. 2 presents a schematic view of interconnections between system components that cooperate to implement a virtual file system in a cloud-based environment, according to an embodiment.

FIG. 3 depicts an environment that can support embodiments of a protocol implemented using components of a virtual file system in a cloud-based environment, according to an embodiment.

FIG. 5 depicts an asynchronous processing technique facilitated by a virtual file system in a cloud-based environment, according to an embodiment.

FIG. 6 depicts a peer-to-peer metadata sharing technique facilitated by a virtual file system in a cloud-based environment, according to an embodiment.

FIG. 8 illustrates a concurrent write operation technique implemented in a virtual file system in a cloud-based environment, according to an embodiment.

FIG. 10 depicts an object locking technique facilitated by a virtual file system in a cloud-based environment, according to an embodiment.

FIG. 12 depicts a visual lock display technique as facilitated by a virtual file system in a cloud-based environment, according to an embodiment.

FIG. 13A and FIG. 13B depict system components as arrangements of computing modules that are interconnected so as to implement certain of the herein-disclosed embodiments.

DETAILED DESCRIPTION

Figure 1B:
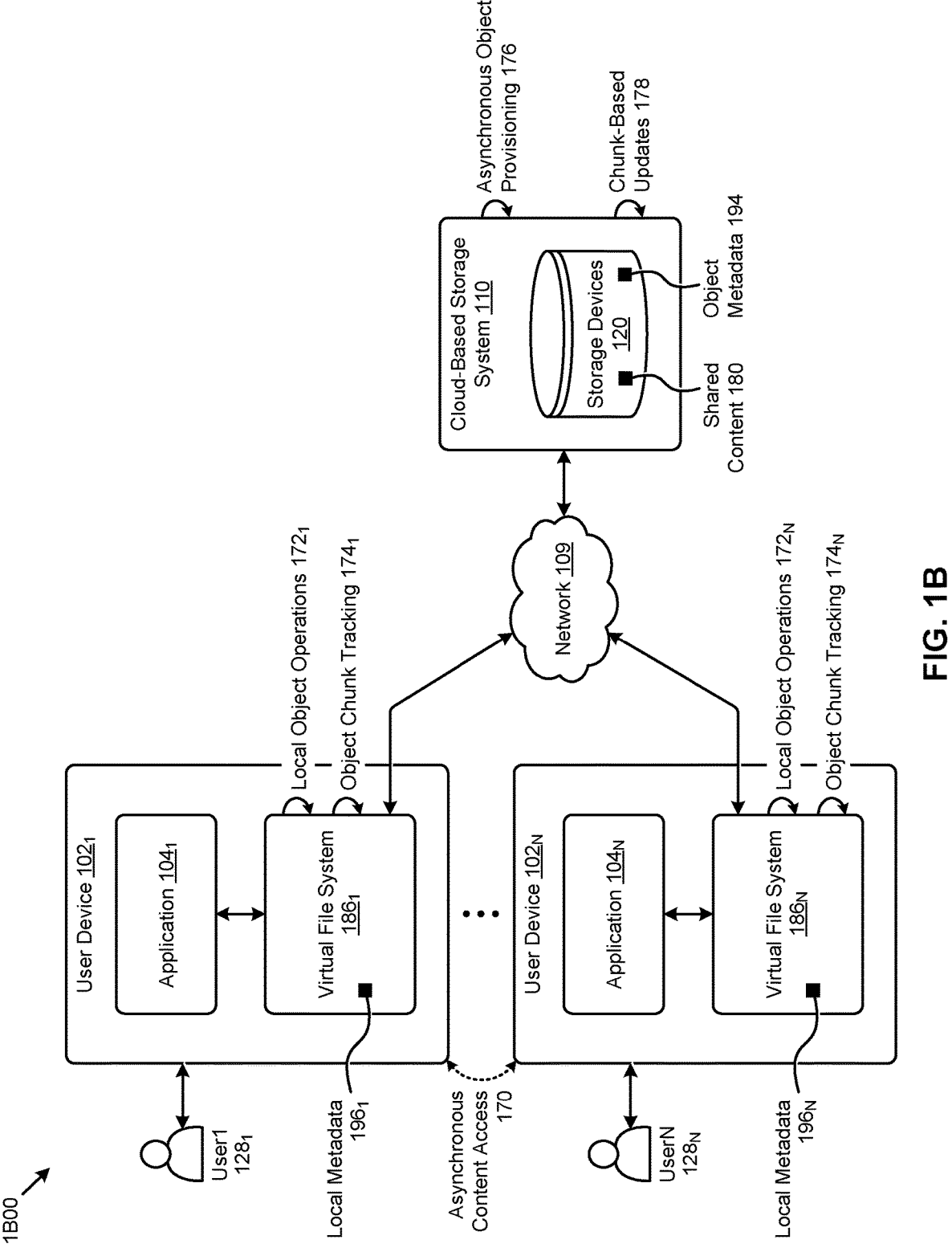
FIG. 1B illustrates an asynchronous collaboration technique facilitated by a virtual file system in a cloud-based environment, according to some embodiments.

Some embodiments of the present disclosure address the problem of enabling multiple collaborators using resource-limited local user devices to efficiently access large volumes of shared content stored on a remote cloud-based storage platform, and some embodiments are directed to approaches for implementing a virtual file system using distributed metadata to facilitate low latency signaling of asynchronous cloud-based content management operations among collaborators. The accompanying figures and discussions herein present example environments, systems, methods, and computer program products for a virtual file system for cloud-based shared content.

Overview

Disclosed herein are techniques that implement a virtual file system (VFS) using distributed metadata to facilitate low latency signaling of asynchronous cloud-based content management operations among collaborators. Specifically, in some embodiments, a set of OS-specific metadata local to a user device can represent certain cloud-based content in a virtual file system accessible by various applications on the user device. In certain embodiments, the local metadata can further characterize local content management operations at each user device. Such local metadata can be quickly updated in response to the local operations, which can occur concurrently and/or asynchronously among various user devices from respective collaborators. In other embodiments, the local metadata from the various user devices can be reconciled by the cloud-based content platform using, in part, a set of remote metadata. In some embodiments, the local metadata might also be reconciled using various peer-to-peer techniques. Other techniques can be implemented to update and/or facilitate access to the underlying content data associated with the local content management operations, according to certain embodiments.

As discussed herein, a virtual file system is a layer between a user device's native file system and the file storage system of the cloud-based content platform.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A1 presents a logical system view 1A100 of a virtual file system for cloud-based shared content. As an option, one or more variations of logical system view 1A100 or any aspect thereof may be implemented in the context of the architecture and functionality of the embodiments described herein. The logical system view 1A100 or any aspect thereof may be implemented in any environment.

As shown, the logical system view 1A100 comprises a local client 188 such as a user device (e.g., smart phone, laptop, etc.) that can have an operating system 182 that includes a file system viewer 184. As shown, the file system viewer 184 might render a visual representation of the certain objects such as directories (e.g., folder A, folder B, etc.) and/or files (e.g., file C, file D, etc.) accessible at the local client 188. However, some or all of the objects (e.g., directories, files, etc.) accessible and/or visible (e.g., from within the file system viewer 184, or from within any application) might not need to be managed by the operating system 182. For example, an instance of Microsoft Word can access files and/or folders through the virtual file system. In some cases, the primary storage for such objects might be implemented across a network 109 by a cloud-based storage system 110.

For example, certain instances of the cloud-based storage system 110 can be embodied as a cloud-based and/or SaaS-based storage management architecture having one or more instances of storage devices 120. The storage devices 120 can comprise any combination of hardware and software that allows for ready access to the data (e.g., content, objects, etc.) stored on the storage devices 120. For example, the storage devices 120 might be implemented as computer memory operatively managed by an operating system, hard disk drives, solid state drives, networked-attached storage, storage area networks, cloud-based storage, and/or any other type of storage facility and/or architecture that is capable of storing data. The data in the content storage device can be implemented as any type of data objects and/or files.

One advantage of the cloud-based storage system 110 serving as the primary storage for certain objects accessible by the local client 188 can be the capability of the cloud-based storage system 110 to facilitate storage functionality as a service on a hosted platform. In such cases, each instance of the local client 188 (e.g., each user) that needs the service does not need to install and configure a respective instance of the cloud-based storage service components on a network (e.g., intranet) comprising the instance of the local client 188. Further, the host environment of the cloud-based storage system 110 can provide storage services to multiple users and/or scale to service any number of users.

According to the herein disclosed techniques, a virtual file system module (e.g., the shown virtual file system $186_1$) can be delivered to the local client 188 to facilitate access to objects stored at the cloud-based storage system 110. As described herein, the virtual file system $186_1$ can address the problems attendant to enabling multiple users (e.g., collaborators) using resource-limited local user devices (e.g., local client 188) to efficiently access large volumes of shared content stored on a remote cloud-based storage platform (e.g., cloud-based storage system 110). As an example, the virtual file system $186_1$ can enable any native application and/or directory finder and/or explorer at the local client 188 to access various remotely hosted content objects. Specifically, and as shown in FIG. 1A1, the objects and/or items accessible by a given user at the local client 188 might be presented as a virtual disk mounted at the local client 188. Other techniques and/or capabilities can be facilitated by the virtual file system $186_1$. One scenario describing such techniques is shown in FIG. 1B.

Figure 2:
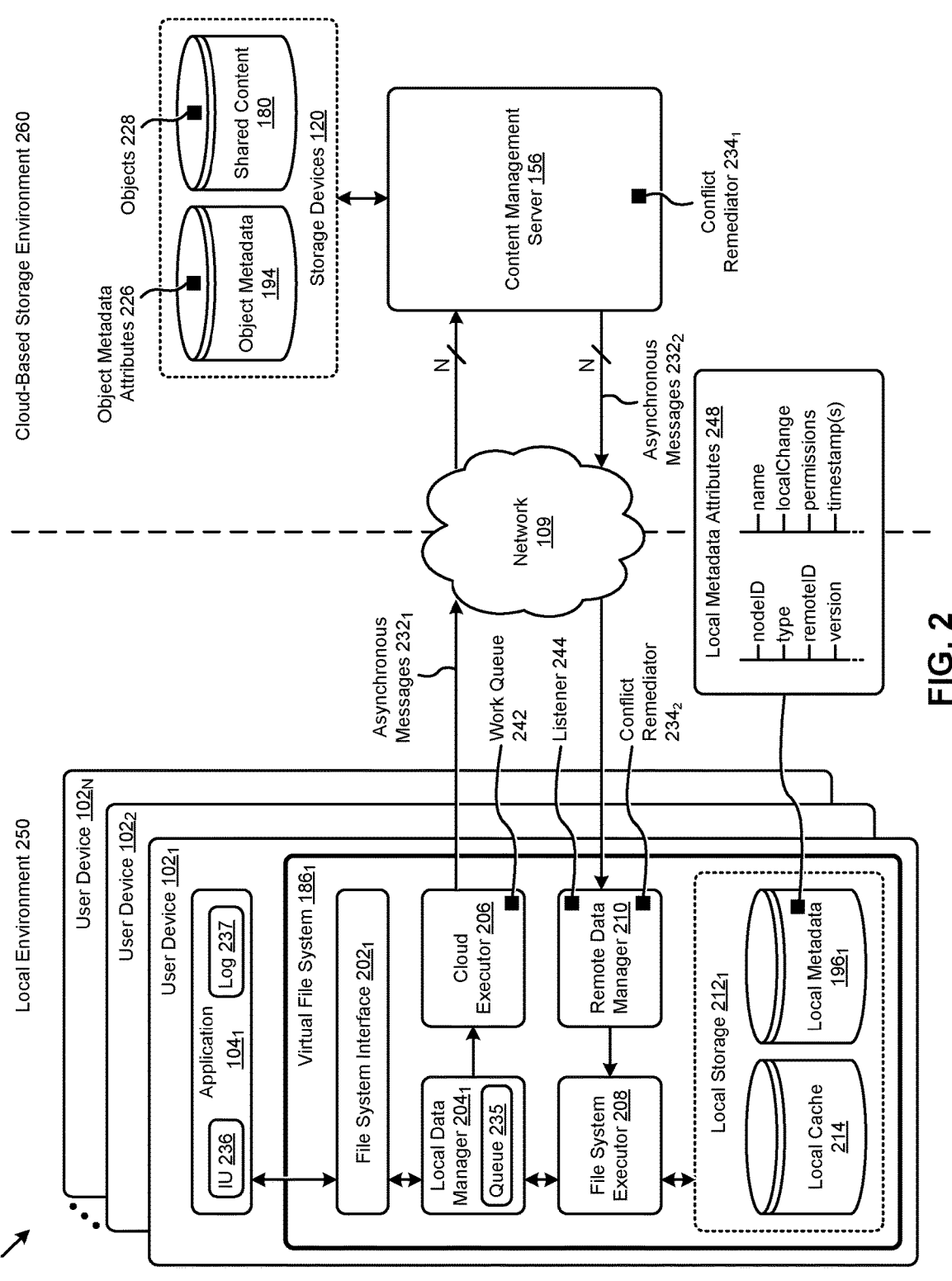
Figure 3:
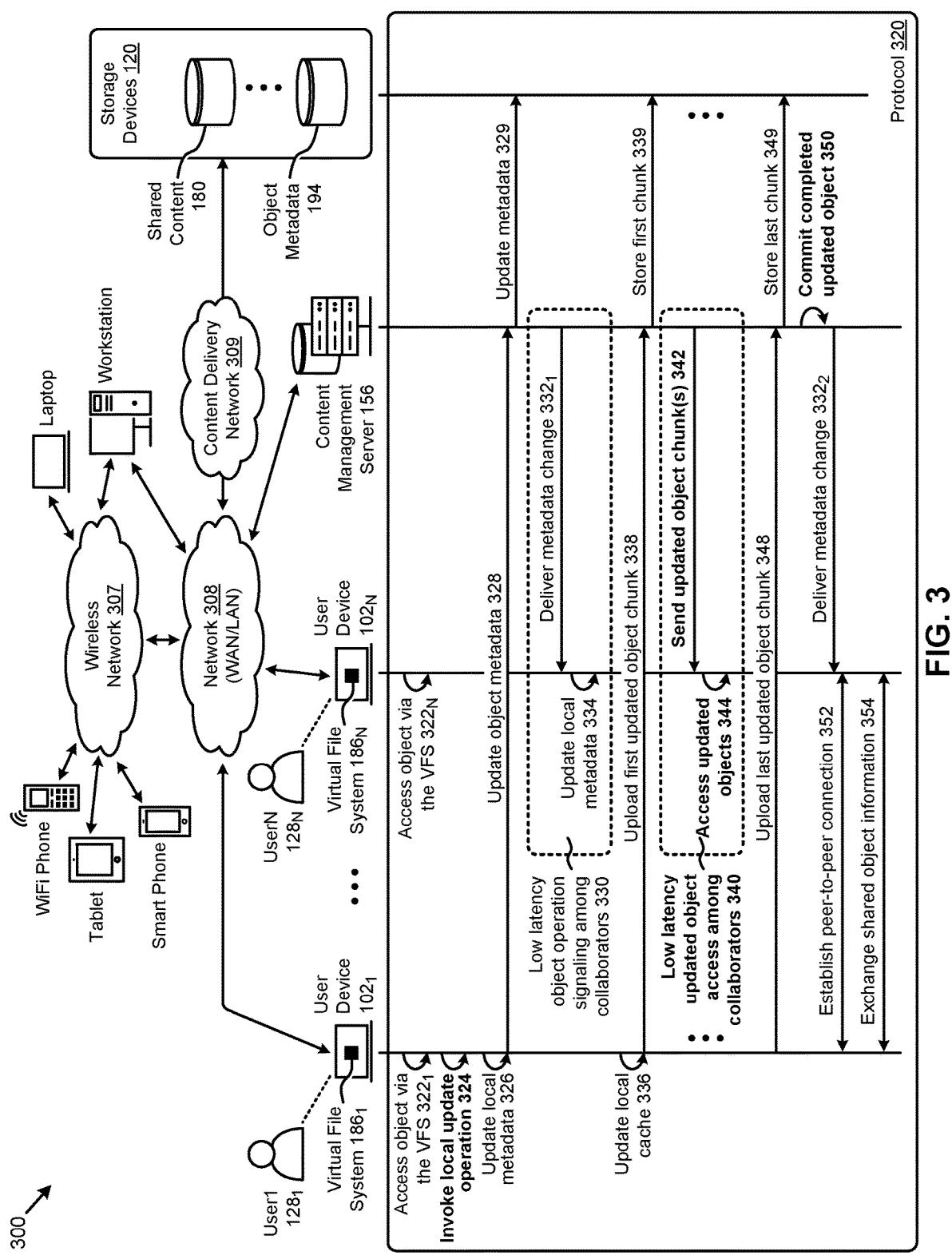

FIG. 1A2 and FIG. 1A3 presents views for comparison of user operations and notifications as experienced by users when accessing cloud-based shared content.

As shown in FIG. 1A2, a first user (e.g., User1 $128_1$) might open version V1 of a file. Contemporaneously, a second user (e.g., UserN $128_N$) might open the same version V1 and be unaware of user activity carried out by the first user. At some later moment, the first user saves the former version V1 as version V2. Then the second user receives notification that the first user committed his or her saved version V2 and they can download V2. After such notification, the second user has access to version V2 for full V2 access. Such a scenario introduces latency that can be eliminated or reduced, for example as is depicted in FIG. 1A3.

FIG. 1A3 depicts low latency notifications and low latency chunk access 140 that eliminates or reduces latency experienced by the second user. As shown, a first user (e.g., User1 $128_1$) opens version V1 of a file. Contemporaneously, a second user (e.g., UserN $128_N$) opens the same version V1, and is made aware of operations being carried out by the first user (e.g., see low latency notification 136). As shown, the second user might see a lock icon 138 or a thumbnail or some other representation of the version V1. Immediately upon or shortly after initiation of a save/upload operation of version V2 by the first user, the second user can gain access to certain portions or chunks of the new version V2 (e.g., chunk-based access 142). Additional chunks or portions of version V2 can be accessed by the second user on a continuous basis (e.g., as the operation to save/upload version V2 by the first user continues). When the second version V2 is committed (e.g., the save/upload completes) then the second user can gain full access to the newly-committed version V2 (e.g., via full V2 access 147).

The operation timelines shown in FIG. 1A3 offers much earlier access to the second user. Techniques that support chunk-level and/or other asynchronous collaboration are discussed hereunder.

FIG. 1B illustrates an asynchronous collaboration technique 1B00 facilitated by a virtual file system in a highly collaborative cloud-based environment. As an option, one or more variations of asynchronous collaboration technique 1B00 or any aspect thereof may be implemented in the context of the architecture and functionality of the embodiments described herein. The asynchronous collaboration technique 1B00 or any aspect thereof may be implemented in any environment.

The asynchronous collaboration technique 1B00 depicts multiple users collaborating on shared content using the herein disclosed for implementing a virtual file system for cloud-based shared content. As shown, in one or more embodiments, instances of a virtual file system (e.g., virtual file system $186_1$, . . . , virtual file system $186_N$) can be delivered to the user devices (e.g., user device $102_1$, . . . , user device $102_N$) associated with various users (e.g., user1 $128_1$, . . . , userN $128_N$, respectively) to facilitate an asynchronous content access 170 to the shared content 180 stored in the storage devices 120 at the cloud-based storage system 110 over the network 109. For example, various applications (e.g., application $104_1$, . . . , application $104_N$) operating at the user devices can interface with instances of the virtual file system (e.g., virtual file system $186_1$, . . . , virtual file system $186_N$, respectively) to access and/or manage (e.g., edit, etc.) one or more objects comprising the shared content 180.

A user is able to mount multiple virtual file systems at the same time. For example, if a user has two cloud-based storage environment accounts (e.g., one for personal use, and one for business use) the user may run two concurrent instances of the virtual file system so as to manage them separately.

Still other capabilities facilitated by embodiments of the herein disclosed techniques for implementing a virtual file system for cloud-based shared content are possible.

More specifically, in one or more embodiments, the instances of the virtual file system (e.g., virtual file system $186_1$, . . . , virtual file system $186_N$) can use distributed metadata (e.g., local metadata $196_1$, . . . , local metadata $196_N$, object metadata 194) to facilitate low latency signaling of asynchronous cloud-based content management operations among collaborators (e.g., user1 $128_1$, . . . , userN $128_N$). For example, the herein disclosed techniques can enable multiple collaborators to concurrently work on different portions of a single content object without interruption (e.g., without being locked out from editing by the activity of another collaborator). In some embodiments such asynchronous operations can be facilitated, in part, by a set of local metadata (e.g., local metadata $196_1$, . . . , local metadata $196_N$) at the user devices.

For example, the local metadata can be used to track local object operations (e.g., local object operations $172_1$, . . . , local object operations $172_N$) at each device that can be asynchronously reconciled by the cloud-based storage system 110 using, in part, a set of remote metadata (e.g., object metadata 194). This approach can facilitate low latency receipt of local metadata updates in response to collaborative activity. In some cases, a collaborator might receive notification of certain operations invoked by one or more other collaborators prior to completion of the operations (e.g., save and/or close of a file). Further, in certain embodiments, the cloud-based storage system 110 can use the reconciled distributed metadata to execute an asynchronous object provisioning 176 to the various users (e.g., collaborators). In some embodiments, the local metadata might also be reconciled and/or shared using various peer-to-peer techniques.

Other techniques can be implemented using the herein disclosed techniques to update and/or facilitate access to the underlying content data associated with the local object operations. For example, according to some embodiments, the local metadata and/or other capabilities of the virtual file system can be used to track various object chunks (e.g., object chunk tracking $174_1$, . . . , object chunk tracking $174_N$) being managed locally at each user device. In this case, for example, local updates to a given object chunk can be uploaded to the cloud-based storage system 110 to facilitate the cloud-based storage system 110 to avail other collaborators to the chunk-based updates 178. This approach can facilitate low latency access to object updates. In some cases, a collaborator might be able to access a portion (e.g., chunk) of an object (e.g., file) updated by another collaborator prior to the save and/or close of the object, and/or commitment of the updated object at the cloud-based storage system 110. In some embodiments, certain object data sharing might also be facilitated using various peer-to-peer techniques.

The foregoing asynchronous collaboration technique 1B00 and/or other capabilities are facilitated by the herein disclosed techniques for implementing virtual file system for cloud-based shared content. In some embodiments, such shared content can be managed by a cloud-based storage system. One embodiment of such a cloud-based storage system is shown and described as pertains to FIG. 1C.

Figure 1C:
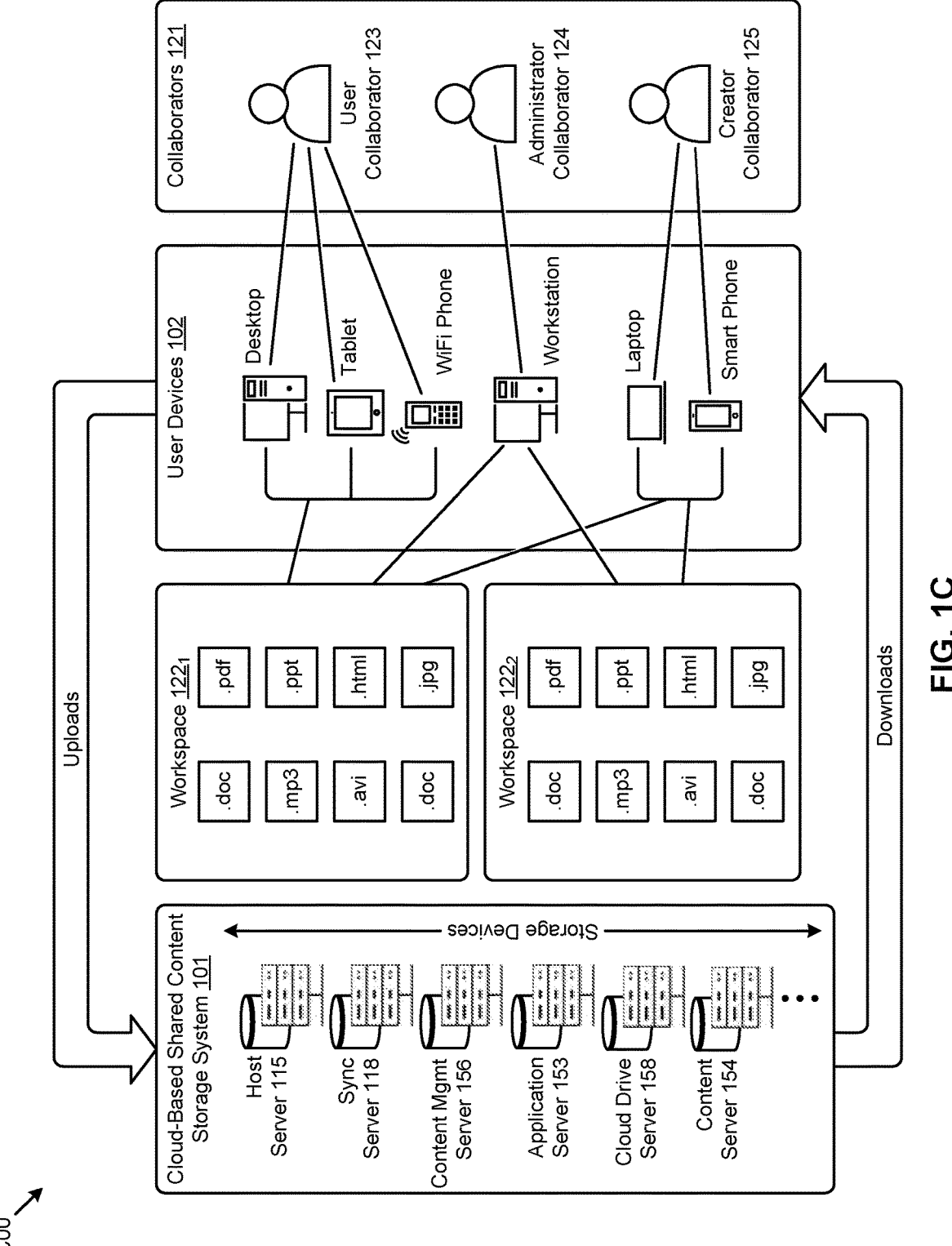
FIG. 1C depicts a cloud-based environment including a collaborative cloud-based shared content management platform that facilitates a virtual file system, according to an embodiment.

FIG. 1C depicts a cloud-based environment 1C00 including a collaborative cloud-based shared content management platform that facilitates a virtual file system. As an option, one or more variations of cloud-based environment 1C00 or any aspect thereof may be implemented in the context of the architecture and functionality of the embodiments described herein. The cloud-based environment 1C00 or any aspect thereof may be implemented in any environment.

As shown, certain users (e.g., collaborators 121) having various collaboration roles (e.g., user collaborator 123, administrator collaborator 124, creator collaborator 125, etc.) can use one or more instances of user devices 102 to interact with one or more workspaces (e.g., workspace 122₁, workspace 122₂, etc.) within the cloud-based environment 1C00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 118, a content management server 156, an application server 153, a cloud drive server 158, a content server 154, etc.

Any of the users can access shared content from the cloud-based shared content storage system 101 without the additional process of manually downloading and storing a file locally on an instance of the user devices 102 such as a desktop computer, a tablet, a WiFi phone, a workstation, a laptop, a smart phone, and/or other user devices. For example, a content object (e.g., computer file, text document, audio file, video file, image file, etc.) created by the creator collaborator 125 might be viewed by the user collaborator 123, without informing the user collaborator 123 where the file is physically stored in the storage devices. Such a facility streamlines the frequently repeated sharing and collaboration processes.

Functions and techniques performed by the cloud-based shared content storage system 101 and/or the client side components (e.g., user devices 102, a collaboration client and/or application on an instance of the user devices 102, etc.) are described herein with further details and with reference to several examples. Further details pertaining to implementing the herein disclosed techniques in the cloud-based environment 1C00 are described in FIG. 1D.

Figure 1D:
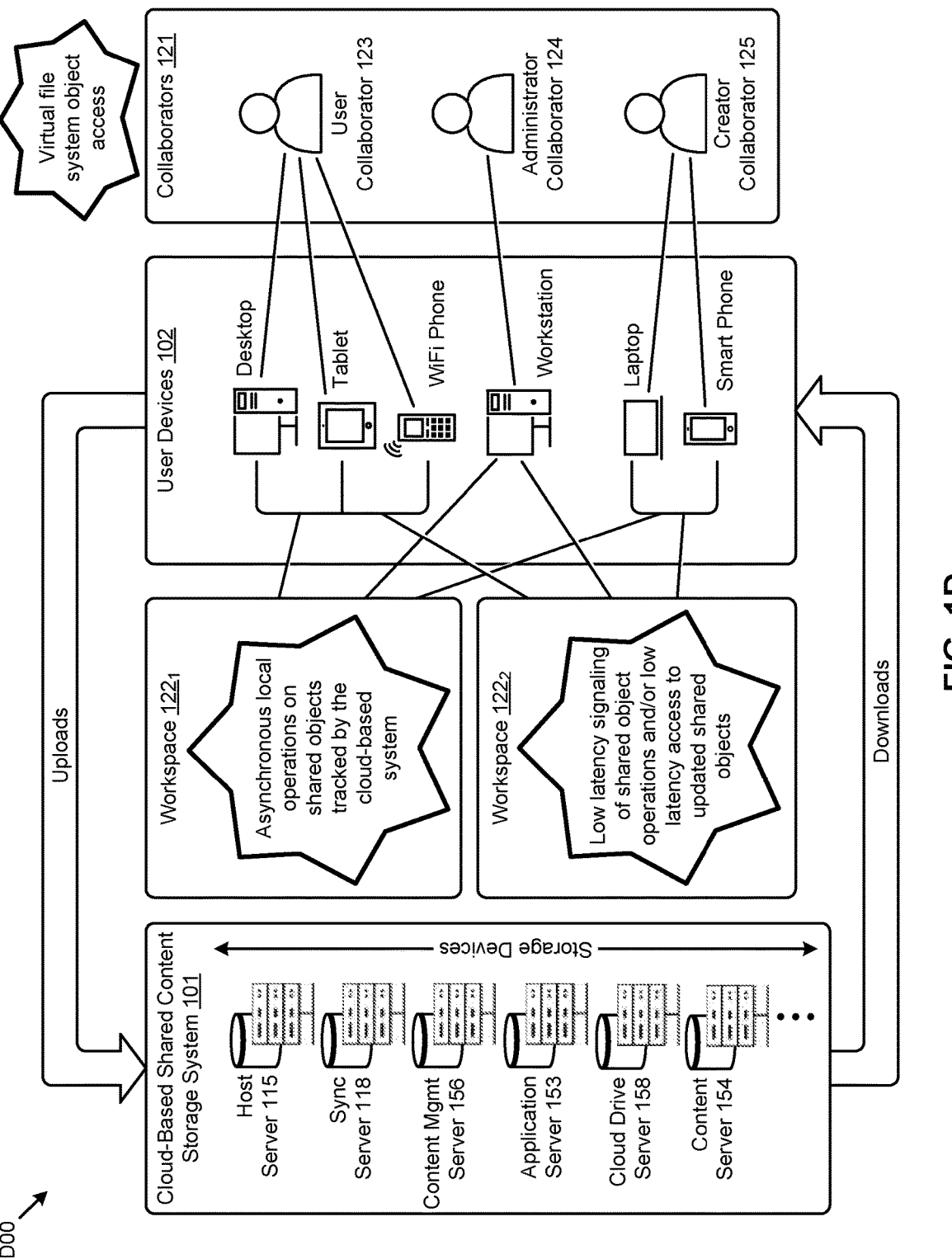
FIG. 1D presents a schematic view of a cloud-based environment having workspace activity facilitated by a virtual file system, according to an embodiment.

FIG. 1D presents a schematic view 1D00 of a cloud-based environment having workspace activity facilitated by a virtual file system. As an option, one or more variations of schematic view 1D00 or any aspect thereof may be implemented in the context of the architecture and functionality of the embodiments described herein. The schematic view 1D00 or any aspect thereof may be implemented in any environment.

The embodiment shown in FIG. 1D is merely one example of various activities and/or operations facilitated by the herein disclosed techniques for implementing a virtual file system in a highly collaborative cloud-based environment. Specifically, as shown, the collaborators 121 (e.g., the user collaborator 123, the administrator collaborator 124, and the creator collaborator 125) in the cloud-based environment might use an instance of the virtual file system on one or more of the user devices 102 to access various shared content (e.g., objects) stored in the storage devices of the cloud-based shared content storage system 101. As shown in workspace 122₁, the herein disclosed virtual file system can facilitate asynchronous local operations (e.g., on each instance of the user devices 102) on shared objects that can be tracked by the cloud-based shared content storage system 101. Further, and as shown in workspace 122₂, the herein disclosed virtual file system can also facilitate low latency signaling of shared object operations (e.g., by another collaborator) and/or low latency access to updated shared objects. For example, the herein disclosed virtual file system can enable certain operations on a shared object by creator collaborator 125 in the workspace 122₁ to be asynchronously tracked by the cloud-based shared content storage system 101 such that the user collaborator 123 can receive a low latency indication of such operations and/or access to changes resulting from the operations in the workspace 122₂. One embodiment of a system for implementing the herein disclosed virtual file system in a highly collaborative cloud-based environment is described as pertaining to FIG. 2.

FIG. 2 presents a schematic view of interconnections between system components 200 that cooperate to implement a virtual file system in a cloud-based environment. As an option, one or more variations of system components 200 or any aspect thereof may be implemented in the context of the architecture and functionality of the embodiments described herein. The system components 200 or any aspect thereof may be implemented in any environment.

FIG. 2 presents various system components in a local environment 250 and a cloud-based storage environment 260 that can be used to implement a virtual file system according to the herein disclosed techniques. Specifically, each instance of various user devices (e.g., user device 102₁, user device 102₂, . . . , user device 102ₙ) can run certain applications that can interface with a local instance of the virtual file system. More specifically, a user device 102 is shown running an application 104₁ that interacts with the virtual file system 186₁. According to some embodiments, the virtual file system 186₁ can comprise a file system interface 202₁, a local data manager 204₁, a cloud executor 206, a file system executor 208, a remote data manager 210, and a local storage 212₁.

As shown, the local storage 212₁ can comprise a local cache 214 and a set of local metadata 196₁. For example, the local cache 214 might comprise one or more partitions of the local memory of the user device 102₁. Further, the local metadata 196₁ can comprise internal data structures for fast access. In some cases, such internal data structures can be protected (e.g., locked). Further, data structures for the local metadata 196₁ can hold a set of local metadata attributes 248, as shown. For example, the local metadata attributes 248 for each object accessible by the virtual file system 186₁ might include a "nodeID" uniquely identifying a certain node in a file tree associated with the object, a "type" attribute describing the node and/or object type (e.g., folder, file, etc.), a "remoteID" uniquely identifying the object in the cloud-based storage environment 260, a "version" attribute describing the version of the object (e.g., from the perspective of the local environment 250), a "name" for the object, a "localChange" bit indicating a local change (e.g., bit="1") that has yet to be confirmed at the cloud-based storage environment 260, a set of "permissions" for the object (e.g., full access, view-only, unlocked, locked, etc.), one or more "timestamp(s)" to indicate various file events (e.g., last accessed, last modified, created, etc.), and/or other attributes.

In some cases, the "localChange" bit might indicate that a local change has occurred merely for a short time, since it can be cleared (e.g., bit="0") when confirmation that the change was committed remotely has been received by the virtual file system 186₁. In other cases, the local metadata 196₁ can be specific to the operating system (OS) of the user device. For example, the structure and/or attributes associated with the local metadata 196₁ might be established at compile time of the virtual file system 186₁ based at least in part on a target OS. As a specific example for a Mac OS, the local metadata attributes 248 might further include "xattr" extended attributes, a "UID" user identifier, and/or a "grou-pID" group identifier.

As shown in the cloud-based storage environment 260, a content management server 156 can represent the various computing devices that carry out the operations of a cloud-based shared content storage platform (e.g., cloud-based shared content storage system 101 in FIG. 1C). The content management server 156 can access the storage devices 120 that can comprise the shared content 180, the object metadata 194, and/or other data to facilitate the cloud-based storage operations. As shown, the object metadata 194 can comprise certain instances of object metadata attributes 226 that characterize the objects 228 stored in the cloud-based storage environment 260.

For example, the object metadata attributes 226 might include certain attributes that characterize the location, version, permissions, access rules, and/or other characteristics of a given object. Further, the shared content 180 can comprise the objects 228 comprising the underlying data accessed by the various user devices in the local environment 250 using the herein disclosed virtual file system. In some cases, certain portions of the objects 228 might be stored in the local cache 214 (e.g., for low latency access), but the portion of the objects 228 stored in the shared content 180 can be substantially larger than the portion of the objects 228 stored in the local cache 214. For example, the user of the user device 102₁ might belong to an enterprise that owns large volumes of shared enterprise content that the user might need to access. However, the user device 102₁ might only be able to store a small portion of the shared enterprise content. Access to such large volumes of shared content stored on a remote cloud-based storage platform by multiple collaborators using resource-limited (e.g., memory-limited) local user devices can be facilitated by the embodiment of the herein disclosed virtual file system shown in FIG. 2.

Specifically, the user of the user device 102₁ might invoke various file system operations from the application 104₁ that are received by the file system interface 202₁ of the virtual file system 186₁. The file system interface 202₁ can interpret the file system calls (e.g., in an OS-specific structure) for dispatch to the local data manager 204₁ in a structure common (e.g., OS-agnostic) to the virtual file system 186₁. In response to the dispatched call, the local data manager 204₁ can issue one or more commands and/or calls to the file system executor 208 and/or the cloud executor 206. For example, the file system executor 208 might process commands for the local environment 250, while the cloud executor 206 might process commands for the cloud-based storage environment 260. Specifically, the file system executor 208 can process commands and/or calls associated with the local storage 212₁ such as a change to the local metadata 196₁ and/or a change to the local cache 214. For example, an edit to a portion (e.g., chunk) of an object using the application 104₁ might invoke a call to the file system executor 208 to change various metadata attributes (e.g., version, size, last modified timestamp, etc.) in the local metadata 196₁ and/or change portions of the local cache 214 corresponding to the modified object chunk. In some cases, such operations by the file system executor 208 are invoked synchronously in response to the originating file system call dispatched from the file system interface 202₁.

In comparison, the cloud executor 206 can receive calls from the local data manager 204₁ into a work queue 242 for asynchronous delivery (e.g., see asynchronous messages 232₁) to the content management server 156 through the network 109. For example, the foregoing edit to a portion of an object using the application 104₁ might also invoke a call to the cloud executor 206 to change various object metadata attributes (e.g., version, size, last modified timestamp, etc.) in the object metadata 194 and/or change portions of the shared content 180 corresponding to the modified object chunk. Such operations can be issued from the work queue 242 as asynchronous message 232₁. As shown, the content management server 156 can receive such asynchronous messages from any and all (e.g., N) user devices of various collaborators.

Conflict remediation can be implemented either on the server side through server side remediation (e.g., see conflict remediator 234₁) or in the local environment through client side remediation (e.g., see conflict remediator 234₂), or both, with either conflict remediator taking actions independently, or with both conflict remediators taking actions in a coordinated fashion.

A conflict remediator at the content management server 156 can reconcile the information (e.g., versions, object changes, etc.) received from the local environment 250 to deliver (e.g., broadcast) the reconciled information to the N user devices of the collaborators in a set of asynchronous messages 232₂. For example, the asynchronous messages 232₂ might include metadata updates and/or object updates. Such asynchronous updates can be received locally by a listener 244 at the remote data manager 210. The remote data manager 210 can schedule the received changes with the file system executor 208 to be applied to the local storage 212₁. This approach allows each collaborator to work asynchronously (e.g., independently) on various shared content, yet receive low latency (e.g., near real time) updates pertaining to operations performed by other collaborators in a respective instance of the local environment 250.

In environments where collaborators work asynchronously on various shared content it is possible for conflicts to be raised. The server can perform certain aspects of conflict remediation. For example, if the server receives two conflicting operations to be applied over a single item, the server will order the operations appropriately and apply version indicators as needed. The client can also perform certain aspects of conflict remediation. For example, if a file was edited both locally and remotely, conflict remediator 234₂ would detect such a change and generate actions, messages and/or events. Such events can be posted as an event in a queue (e.g., queue 235).

Some embodiments combine the aforementioned facilities of VFS with a synchronizing application. In some such embodiments, the VFS is partitioned so as have ongoing READ/WRITE access to data structures related to the file system (e.g., file tree, local metadata attributes, file system inodes, etc.). Concurrently, the synchronizing application (1) maps local changes on the VFS and applies them to the cloud, and (2) takes in cloud changes and applies them on the VFS. In some cases, there may be a message emitted and/or logged. Such a message might appear in a user interface (e.g., via UI 236), and/or such a message might be logged to a logging file (e.g., via log 237).

Strictly as additional examples, if a change is made on the VFS, the UI 236 might show a notification (e.g., of a pending operation), possibly using a VFS messaging system and/or messaging system facilities that are natively provided by software on the user device such as a growl message, or a tooltip or tooltip-like message.

Another example usage of the UI component is to show icons pertaining to the files and folders so as to indicate the state of such files or folders. For example, when a file is being uploaded, an icon might show a "pending" state indication on that file's representation in the UI. As another example, if a client-side folder is deemed to be fully synchronized with the server, a UI might show a "check mark" state indication to signify that status.

The system components 200 of FIG. 2 present merely one partitioning. The specific example shown is purely exemplary, and other partitioning is reasonable. One embodiment of an environment and protocol supporting such systems, subsystems, and/or partitionings for implementing a virtual file system in a highly collaborative cloud-based environment is shown in FIG. 3.

FIG. 3 depicts an environment 300 that can support embodiments of a protocol implemented using components of a virtual file system in a cloud-based environment. As an option, one or more variations of environment 300 or any aspect thereof may be implemented in the context of the architecture and functionality of the embodiments described herein. The environment 300 or any aspect thereof may be implemented in any environment.

As shown in FIG. 3, the environment 300 comprises various computing systems (e.g., servers and devices) interconnected by a wireless network 307, a network 308, and a content delivery network 309. The wireless network 307, the network 308, and the content delivery network 309 can comprise any combination of a wide area network (WAN), local area network (LAN), cellular network, wireless LAN (WLAN), or any such means for enabling communication of computing systems. The wireless network 307, the network 308, and the content delivery network 309 can also collectively be referred to as the Internet. The content delivery network 309 can comprise any combination of a public network and a private network. More specifically, environment 300 can comprise at least one instance of the content management server 156 and the at least one instance of storage devices 120. The servers and storage devices shown in environment 300 can represent any single computing system with dedicated hardware and software, multiple computing systems clustered together (e.g., a server farm, a host farm, etc.), a portion of shared resources on one or more computing systems (e.g., a virtual server), or any combination thereof. For example, the content management server 156 and the storage devices 120 can comprise a cloud-based content management platform that provides shared content management and storage services.

The environment 300 further comprises instances of user devices (e.g., user device 102₁, . . . , user device 102_N) that can represent one of a variety of other computing devices (e.g., a smart phone, a tablet, a WiFi phone, a laptop, a workstation, etc.) having software (e.g., operating system, applications, etc.) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over wireless network 307, network 308, and content delivery network 309. As shown, user device 102₁ can be operated by user1 128₁, and user device 102_N can be operated by userN 128_N. To facilitate the herein disclosed techniques, an instance of virtual file system 186₁ can operate on user device 102₁, and an instance of virtual file system 186_N can operate on user device 102_N. Also, storage devices 120 can comprise shared content 180 and object metadata 194 to, in part, facilitate the herein disclosed techniques.

As shown, the user device 102₁, the user device 102_N, the content management server 156, and the storage devices 120 can exhibit a set of high order interactions (e.g., operations, messages, etc.) in a protocol 320. Specifically, and as shown, a certain object can be accessed at the user device 102₁ and the user device 102_N using the virtual file system (VFS) (see operation 322₁ and operation 322_N, respectively). For example, user1 128₁ and userN 128_N might access the same object or a different object. User1 128₁ might then invoke a local object operation at the user device 102₁ (see operation 324). In response to the local object operation, the virtual file system 186₁ can perform certain local and/or cloud operations. For example, the virtual file system 186₁ can update the local metadata on the user device 102₁ (see operation 326). The virtual file system 186₁ can further issue a call to the content management server 156 to update the object metadata 194 (see message 328 and message 329). In response to the object metadata update, the content management server 156 can deliver information pertaining to the metadata change to the virtual file system 186_N on the user device 102_N (see message 332₁), which can then be applied to the local metadata at the user device 102_N (see operation 334). In some cases, the content management server 156 can broadcast such metadata change information to all collaborators associated with the subject object. Receiving and applying the metadata changes at the user device 102_N based on operations at the user device 102₁ can be described as low latency object operation signaling among collaborators (see grouping 330).

In response to the local object operation (see operation 324), the virtual file system 186₁ can further update the local cache on the user device 102₁ (see operation 336). For example, the object accessed at the user device 102₁ might have been modified such that one or more updated portions (e.g., chunks) of the object can be saved to the local cache. The virtual file system 186₁ might also upload the updated chunks pertaining to the object to the content management server 156 in the cloud-based storage environment. Specifically, in some embodiments, the updated object chunks might be uploaded and stored in a certain sequence, starting with a first updated chunk (see message 338 and message 339). In response to one or more of the updated chunks being uploaded, the content management server 156 can avail certain updated object chunks to other users such as userN 128_N at user device 102_N (see message 342). UserN 128_N can use the virtual file system 186_N at the user device 102_N to access the updated object chunks availed by the content management server 156 (see operation 344). Accessing the updated objects (e.g., updated chunks) at the user device 102_N based on object updates at the user device 102₁ can be described as low latency updated object access among collaborators (see grouping 340). In some cases, such low latency updated object access can occur prior to the last updated object chunk being uploaded, stored, and/or committed at the content management server 156 (see message 348, message 349, and operation 350). In some cases, a set of metadata changes (e.g., new object version, timestamps, etc.) can be delivered to the collaborators following the commit of the complete updated object at the cloud-based storage system (see message 332₂).

In some embodiments, the instances of the virtual file systems at the user devices can facilitate certain peer-to-peer interactions. Specifically, and as shown, a peer-to-peer connection might be established between user device 102₁ and user device 102_N (see message 352) to facilitate an exchange of certain shared object information (see message 354) directly between the virtual file systems of each user device. As an example, certain local metadata and/or object data (e.g., files) might be exchanged among peers (e.g., user devices) operating an instance of the herein disclosed virtual file system. Another embodiment of such a virtual file system is shown and described as pertains to FIG. 4A.

Figure 4A:
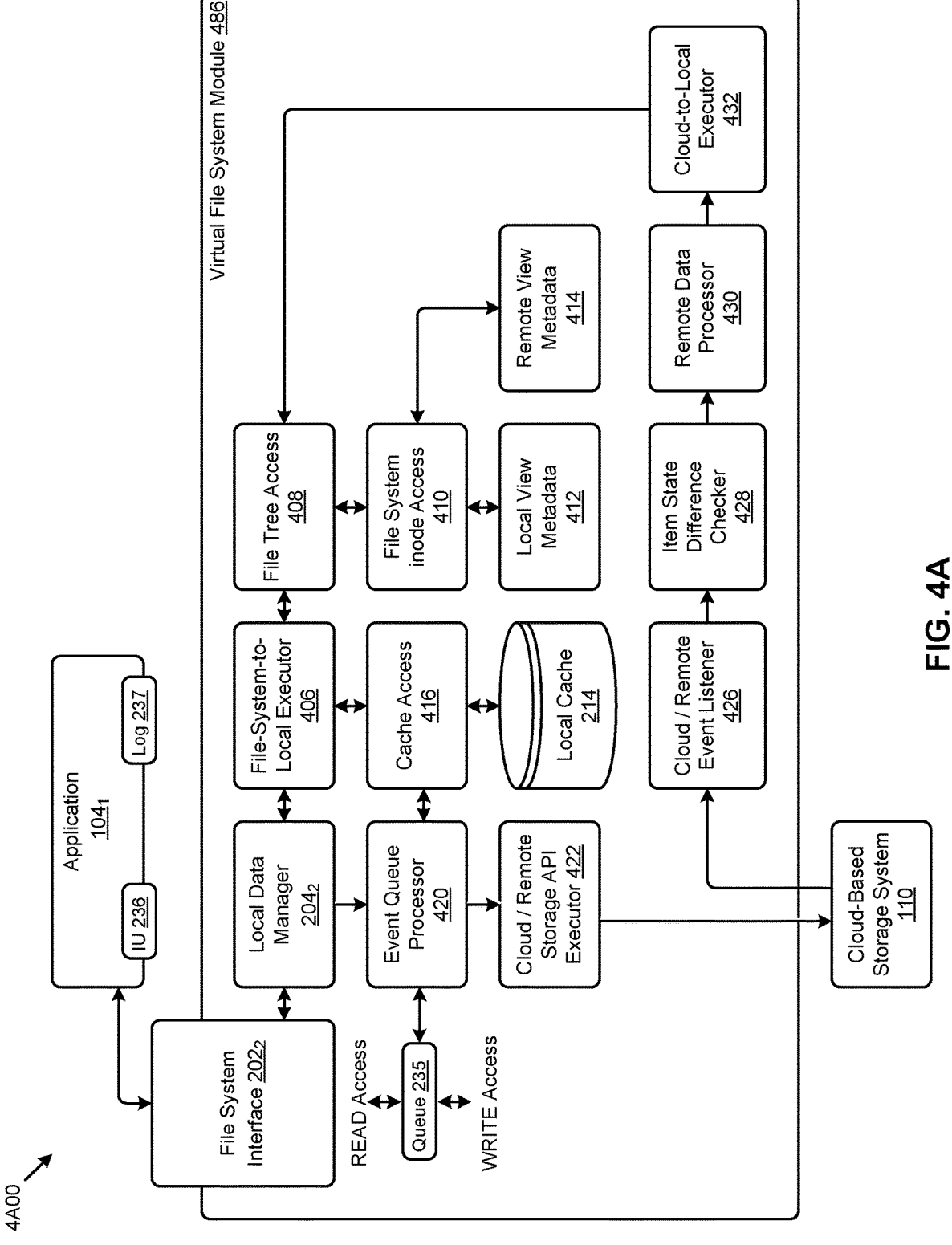
FIG. 4A is a diagram of a virtual file system implementation, according to an embodiment.

FIG. 4A is a diagram of a virtual file system implementation 4A00. As an option, one or more variations of virtual file system implementation 4A00 or any aspect thereof may be implemented in the context of the architecture and functionality of the embodiments described herein. The virtual file system implementation 4A00 or any aspect thereof may be implemented in any environment.

FIG. 4A illustrates an embodiment of a virtual file system module 486 implemented according to the herein disclosed techniques. As shown, the virtual file system module 486 is composed of a file system interface that emulates a local file system and plurality of operation pipelines organized such that output results from an upstream operational unit are provided as inputs to a downstream operational unit. As an example, consider a certain request issued by the application $104_1$ to access a file managed by the virtual file system module 486. In such a case, the request can be issued to an instance (e.g., MacFS, WinFS, etc.) of the file system interface $202_2$ specific to the local operating system. More specifically, consider a request that pertains to (a) a write to update the contents of a file and (b) a rename of the file. In this case, the request can be sent to the local data manager $204_2$ to process the various actions comprising the request. Specifically, the local data manager $204_2$ can be considered the component of the virtual file system module 486 that receives the file access calls to perform operations that execute any necessary steps to implement the calls.

In some cases, the local data manager $204_2$ can manage two processing paths for certain requests. For example, for a first path, the local data manager $204_2$ can modify locally maintained data and/or metadata to implement the request. For a second path, the local data manager $204_2$ can also coordinate the request as it pertains to changes that might need to be made in the cloud-based storage system 110.

With regards to local processing, a file-system-to-local executor 406 can perform various instantiations of a cache access 416 to, for example, save a copy of a modified file in local cache 214. In some embodiments, the local cache 214 can be a portion of the local storage $212_1$ at a client (e.g., user device) that is designated to hold certain object data (e.g., objects 228) for the virtual file system module 486. Such a local cache can permit faster access to recently and/or frequently accessed objects (e.g., files) to reduce the frequency of retrieving such objects from the cloud-based storage system 110. In some cases, for example, any local changes made to files can be saved to the local cache 214.

In addition, certain types of changes may also need to be reflected in the metadata that is used to track the objects (e.g., files) accessed by the virtual file system module 486. Such changes include, for example, operations that delete, rename, or move files within the virtual file system module 486. In such cases, various instances of a file tree access 408 can be performed to, for example, apply changes to certain VFS nodes (e.g., inodes).

In certain embodiments, two sets of metadata can be maintained in the virtual file system module 486. As an example, a set of local view metadata 412 can correspond to metadata that might be changed locally without confirmation of those changes from the cloud-based storage system 110. Also, a set of remote view metadata 414 can correspond to metadata that holds the most recent snapshot of information from the point of view of the cloud-based storage system 110.

When local file accesses are made using the virtual file system module 486, the remote view metadata 414 can be first checked to determine the state of the relevant files from the perspective of the cloud-based storage system 110. The local view metadata 412 can be used to reveal the locally-understood "delta" from the perspective of the cloud-based storage system 110. In some cases, such deltas or lack of deltas can be used to ensure any file access using the virtual file system module 486 reflects certain past actions that might have previously affected the subject files.

In the earlier mentioned write and rename operations, a request can be received to rename a file managed by the virtual file system module 486. In such cases, a file system inode access 410 can be performed to apply the requested change (e.g., rename) immediately to the local view metadata 412. Such an approach can allow the local client to continue to operate based on the locally-made change even though the change might not have been made throughout the collaborative environment (e.g., at the cloud-based storage system 110, or at any other client devices that can access the subject file using a respective local instance of the virtual file system).

With regard to local file system changes, the local data manager $204_2$ can place file access requests into an event queue (e.g., queue 235) to be handled by the event queue processor 420. In some situations, the local data manager might generate an event (e.g., "file A was renamed to file B"). This event might be broadcast or otherwise emitted through a messaging system that provides READ and WRITE access to events (e.g., in queue 235). Such a messaging system and temporary persistence of events allows for other applications (e.g., a syncing engine, a logging tool, UI component, etc.) to listen for file system events and then to use them to initiate file-related operations. For example, a UI component may receive a "file renamed" event and respond by raising a notification for consideration by the user. Such an event might also be logged using a log 237.

With regard to remote processing, the local data manager $204_2$ can also place certain file access requests into an event queue (e.g., queue 235) to be handled by any instance of an event queue processor 420. The event queue processor 420 can access the queue 235 and can, for example, schedule certain calls to commit changes pertaining to a file write and/or a file rename to the cloud-based storage system 110. In some cases, such commits and/or other operations can be implemented by calling a cloud/remote storage API executor 422. The calls to the cloud/remote storage API executor 422 may comprise a remote storage application programming interface call that specifies the file ID for the file recognized by the cloud-based storage system 110, and/or an API call that implements the change (e.g., rename, upload, upload version, delete, etc.).

In some embodiments, within the cloud-based storage system 110, an API layer can receive the API calls from the cloud/remote storage API executor 422 to operate on the data and/or metadata at the cloud-based storage system 110. For example, a mapping table (e.g., in a set of object metadata) may exist at the cloud-based storage system 110 to map file IDs to filenames. In this case, for example, a rename operation might result in changes to the entry for the subject file(s) in the mapping table. Such changes may further result in an entry being placed in an action log that is exposed for listening.

Specifically, at the client device, a cloud/remote event listener 426 can listen for events pertaining to the client device. For example, the cloud/remote event listener 426 might listen for events pertaining to any files in the virtual file system module 486 at the client device. Specifically, in the foregoing example, the rename operation committed at the cloud-based storage system 110 pertains to the local client device such that the cloud/remote event listener 426 receives the event.

For such received event information, an item state difference checker 428 can review the event information associated with the event to determine how the event information relates to and/or differs from the local view of the subject items (e.g., files) corresponding to the event. In some cases, based on the type and/or extent of the differences identified by the item state difference checker 428, a remote data processor 430 and/or a cloud-to-local executor 432 can execute certain data operations locally at the client device. For example, the rename operation committed at the cloud-based storage system 110 can result in a change to the remote view metadata 414 to reflect certain file tree changes corresponding to the renaming of the file. With the remote view metadata 414 now reflecting this change, the local view metadata 412 can be modified to remove this change (e.g., since it is no longer needed to record the change).

In some cases, the local cache 214 may also be updated based on a received event. For example, if the received event pertains to a change made to a subject file at another client device (e.g., by another collaborator) that was not already known at the client device, a cached version of the subject file might be invalidated. As another example, a received event at a given client device pertaining to a file change invoked by the same client device might not require an update and/or invalidation of a cached version of the file.

Figure 4B:
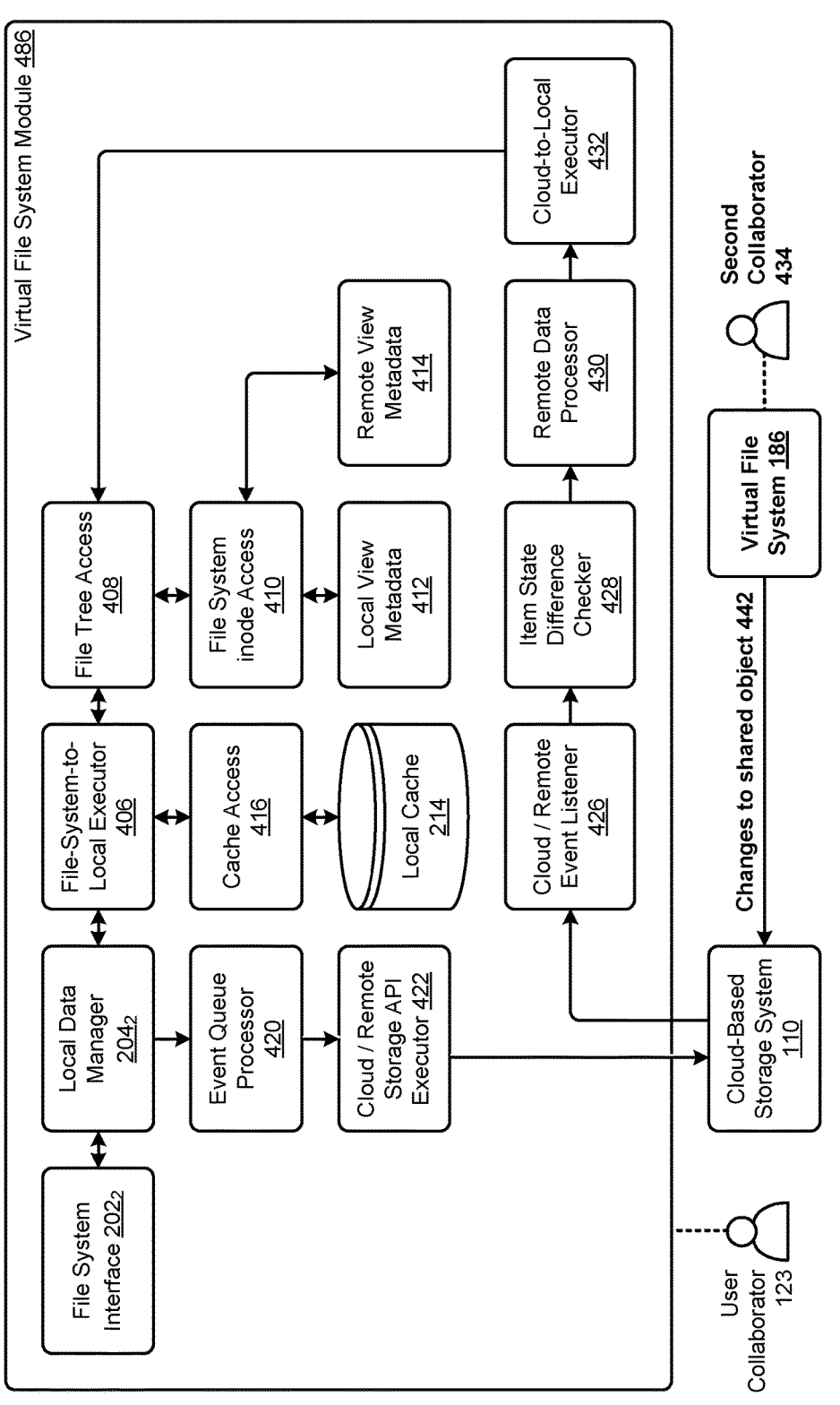
FIG. 4B is a diagram of a remote collaboration technique facilitated by a virtual file system, according to an embodiment.

FIG. 4B is a diagram of a remote collaboration technique 4B00 facilitated by a virtual file system. As an option, one or more variations of remote collaboration technique 4B00 or any aspect thereof may be implemented in the context of the architecture and functionality of the embodiments described herein. The remote collaboration technique 4B00 or any aspect thereof may be implemented in any environment.

FIG. 4B illustrates how the virtual file system module 486 described in FIG. 4A can be configured to handle changes made by a remote collaborator 434. An example scenario might pertain to a shared file that is collaboratively shared between users (e.g., user collaborator 123 and remote collaborator 434) on multiple systems (e.g., user devices), such that any of the users may perform changes to the shared file. Specifically, the shared file might be represented by the virtual file system module 486 operating on a user device corresponding to the user collaborator 123. In this case, for example, the inode structure maintained for the subject file can be locally stored within the local view metadata 412 and/or the remote view metadata 414. As earlier mentioned, the local view metadata 412 can correspond to metadata that might be changed locally without confirmation of those changes from the cloud-based storage system 110. Also, the remote view metadata 414 can correspond to metadata that holds the most recent snapshot of information from the point of view of the cloud-based storage system 110.

The shared file might also be represented by the virtual file system 186 operating on a user device corresponding to the remote collaborator 434. In such cases, the remote collaborator 434 might invoke a change to the shared file using the virtual file system 186 (see message 442). At some point in time, the change invoked by the remote collaborator 434 might be committed to the cloud-based storage system 110. Within the cloud-based storage system 110, an API layer can receive the API call to make the requested changes responsive to the actions of the remote collaborator 434. For example, the API call might result in changes made to the data and/or metadata at the cloud-based storage system 110 such as changes modifying various ID-to-name mapping tables. Such changes can further result in an entry being placed in an action log that is exposed for listening.

The cloud/remote event listener 426 at the virtual file system module 486 can listen for events pertaining to the client device. For example, the cloud/remote event listener 426 might listen for events pertaining to any files in the virtual file system module 486 at the client device. Specifically, in the foregoing example, the change made by the remote collaborator 434 committed at the cloud-based storage system 110 pertains to the local client device such that the cloud/remote event listener 426 receives the event.

For such received event information, an item state difference checker 428 can review the event information associated with the event to determine how the event information relates to and/or differs from the local view of the subject items (e.g., files) corresponding to the event. For example, the changes made by the remote collaborator 434 might require changes at the virtual file system module 486 of the user collaborator 123. Specifically, the item state difference checker 428 might specify that certain attributes of the remote view metadata 414 reflect file tree changes pertaining to the changes made to the shared file by the remote collaborator 434. In some cases, any data in the local view metadata 412 associated with the shared file that might conflict with updated data in the remote view metadata 414 can be removed as necessary so as to avoid such conflicts.

In other conflict situations, remediation can be initiated upon classification of the conflict. For example, if a file was edited locally, and a notification was received that that same file was edited remotely as well, then one possible remediation might be to generate a "conflict" file. Such a conflict file could exist in the same container (e.g., folder) as the original file (e.g., with an appropriate name to indicate the existence and/or nature of the conflict). In this manner, the preservation of both sets of data changes gives the user an opportunity to address the conflict (e.g., by manually merging the data, or by deleting one of the copies, etc.). Heuristics can be applied automatically before raising events pertaining to manual intervention. For example, in the situation where a file was edited locally, and that same file was edited remotely as well, a heuristic might apply a "local wins" rule, or might apply a "remote wins" rule, or might merge changes, or might keep both files, as heretofore described.

In some cases, based on the type and/or extent of the differences identified by the item state difference checker 428, a remote data processor 430 and/or a cloud-to-local executor 432 can execute certain data operations locally at the client device. For example, a rename operation committed at the cloud-based storage system 110 can result in a change to the remote view metadata 414 to reflect certain file tree changes corresponding to the renaming of the file. With the remote view metadata 414 now reflecting this change, the local view metadata 412 can be modified to remove this change (e.g., since it is no longer needed to record the change).

In some cases, the local cache 214 may also be updated based on a received event. For example, if the received event pertains to a change made to a subject file at another client device (e.g., by another collaborator) that was not already known at the client device, a cached version of the subject file might be invalidated. As another example, a received event at a given client device pertaining to a file change invoked by the same client device might not require an update and/or invalidation of a cached version of the file.

The local cache 214 may also be updated if necessary. For example, if the received event pertains to a change to a shared file made by the remote collaborator 434 that was not already known by the virtual file system module 486, a cached version of the shared file in the local cache 214 may be invalidated.

FIG. 5 depicts an asynchronous processing technique 500 facilitated by a virtual file system in a highly collaborative cloud-based environment. As an option, one or more variations of asynchronous processing technique 500 or any aspect thereof may be implemented in the context of the architecture and functionality of the embodiments described herein. The asynchronous processing technique 500 or any aspect thereof may be implemented in any environment.

As earlier described, the herein disclosed techniques facilitate certain local processing of changes asynchronously with a commit of such changes at the cloud-based storage system. FIG. 5 depicts an example of such an asynchronous processing technique 500 enabled by the herein disclosed virtual file system, according to some embodiments. Specifically, the asynchronous processing technique 500 can commence by receiving a request for certain processing (e.g., file change(s)) associated with a file in the virtual file system (see operation 502). Without waiting for a commit at the cloud-based storage system, a local change can be effected to the file (see grouping 504). Specifically, such local operations might include saving the locally changed file in the local data cache (see operation 506). In addition, any necessary metadata changes can be reflected in the local view metadata (see operation 508). The user of the virtual file system can then operate under the assumption that the local changes are at the local user device of the user, even if the changes have not yet been committed at the cloud-based storage system (see operation 510). Such asynchronous operation is enable since the local view metadata provides information that permits the local user device to view the state of the virtual file system with an assumption of the change. In addition, the changed file data can be available to the user device from the local data cache.

Asynchronously to the foregoing local operations (e.g., in the background), the change can be committed to the cloud-based storage system. Specifically, the change can be uploaded to the remote storage system (e.g., cloud-based storage system), for example, for processing and commitment (see operation 512). Confirmation of the commit of the change at the cloud-based storage system is then received (see operation 514).

Responsive to the commit of the change at the cloud-based storage system, the remote view metadata in the virtual file system can be modified to reflect the understanding of the commit by the cloud-based storage system (see operation 516). The local view metadata might then be modified to remove any information recording the earlier invoked operation corresponding to the committed change, since the change is now reflected in the remote view metadata (see operation 518). The user of the virtual file system can then operate with the assumption of the change being recognized globally (see operation 520). As shown, the user can experience uninterrupted operation 522 when transitioning from operating under the local changes to operating under the global change confirmation.

FIG. 6 depicts a peer-to-peer metadata sharing technique 600 facilitated by a virtual file system in a cloud-based environment. As an option, one or more variations of peer-to-peer metadata sharing technique 600 or any aspect thereof may be implemented in the context of the architecture and functionality of the embodiments described herein.

The peer-to-peer metadata sharing technique 600 or any aspect thereof may be implemented in any environment.

Specifically, the peer-to-peer metadata sharing technique 600 can commence with a peer-to-peer (P2P) connection being established between two peers (e.g., user devices, client devices, clients, etc.) (see operation 602). For example, and as shown, a peer-to-peer connection 622 might be established between a peerA 688$_A$ comprising a file system viewer 184A facilitated by a virtual file system 186A, and a peerB 688$_B$ comprising a file system viewer 184B facilitated by a virtual file system 186B. Any suitable approach can be taken to implement the peer-to-peer connection 622. For example, web real-time communication (WebRTC) data channels maybe used to create a browser-based P2P file sharing network between two peers. If any of the clients are behind a firewall, then network address translation (NAT) hole-punching and/or symmetric NAT approaches may be employed to communicate between the IP addresses of the peers. Alternatively, routing between peers may be performed using an independent server. Proximity detection may be used to discover available peers in the network.

The peer-to-peer connection 622 can allow peer metadata to be identified between the peers (see operation 604). Specifically, as an example, the virtual file system 186A of peerA 688$_A$ comprises metadata describing a folder A and an object C in a file tree structure. Further, the virtual file system 186B of peerB 688$_B$ comprises metadata describing a folder B and an objectD in a file tree structure. In the certain embodiments, object-based security and/or permissions may be used to restrict access to only authorized peers. In some cases, such object-based permissions might be applied globally by an enterprise (e.g., from an administration interface).

Certain metadata pertaining to one or more file trees can be transferred from one peer to another peer (see operation 606). For example, and as shown, the file tree comprising the folder B and objectD at peerB 688$_B$ can be transferred to peerA 688$_A$ in a P2P metadata transfer 624. This transfer of data may use either a "push" model to initiate sending of data from a source peer to a destination peer, or alternatively a "pull" model to allow the destination peer to initiate retrieval of data from the source peer. To complete the transfer, the metadata can be stored in the local metadata of the virtual file system 186A for presentation in the file system viewer 184A.

After the file tree has been transferred from peerB 688$_B$ to peerA 688$_A$, the shared file tree (e.g., folder B and objectD) can be viewed and accessed like any other file tree hierarchy in the virtual file system 186A. When any object (e.g., objectD) associated with the transferred metadata is accessed, the virtual file system 186A can retrieve the object from a peer and/or from the cloud-based storage system as described in FIG. 7.

Figure 7:
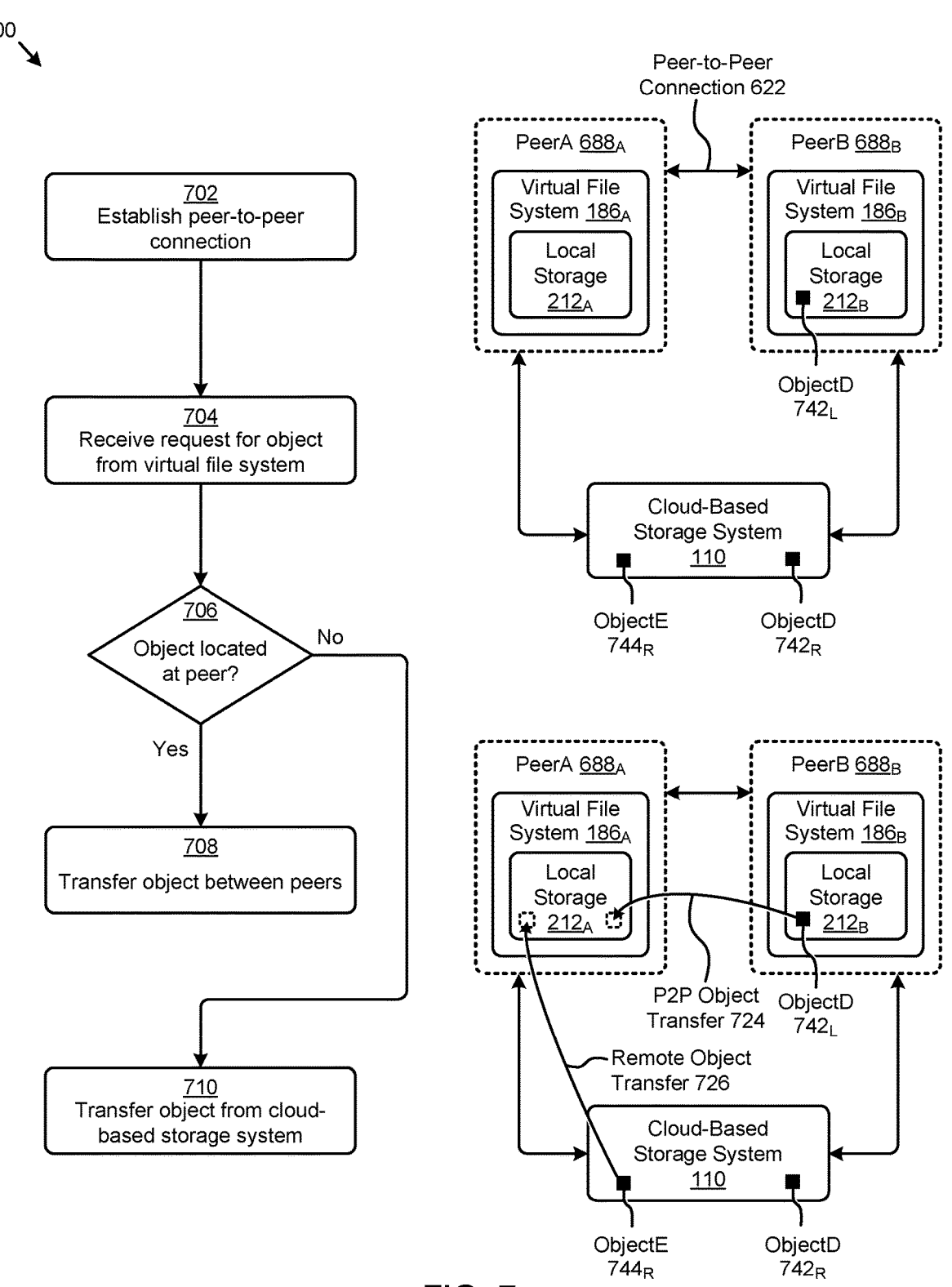
FIG. 7 depicts a peer-to-peer object sharing technique facilitated by a virtual file system in a cloud-based environment, according to an embodiment.

FIG. 7 depicts a peer-to-peer object sharing technique 700 facilitated by a virtual file system in a cloud-based environment. As an option, one or more variations of peer-to-peer object sharing technique 700 or any aspect thereof may be implemented in the context of the architecture and functionality of the embodiments described herein. The peer-to-peer object sharing technique 700 or any aspect thereof may be implemented in any environment.

In addition to metadata, object data within the herein disclosed virtual file system may also be shared using P2P sharing techniques. This permits, for example, objects (e.g., files) and/or portions of objects to be shared between peers within a network—that can facilitate P2P connections—to reduce the resources required to retrieve objects from the cloud-based storage system. The peer-to-peer object sharing technique 700 describes such a technique.

Specifically, the peer-to-peer object sharing technique 700 can commence with a peer-to-peer (P2P) connection being established (see operation 702) between two peers (e.g., user devices, client devices, clients, etc.). For example, and as shown, the peer-to-peer connection 622 earlier described might be established between a peerA $688_A$ comprising a virtual file system 186A having a local storage $212_A$ and a peerB $688_B$ comprising a virtual file system 186B having a local storage $212_B$. As further shown, the local storage $212_B$ at peerB $688_B$ comprises a local instance of an objectD $742_L$. Both peerA $688_A$ and peerB $688_B$ are coupled with the cloud-based storage system 110 according to the herein disclosed techniques. Further, the cloud-based storage system 110 can store a remote instance of the objectD $742_R$ and a remote instance of an objectE $744_R$.

A request might be received at a source peer to send certain object data within its virtual file system to a destination peer (see operation 704). For example, peerB $688_B$ might receive a request from peerA $688_A$ for an instance of the objectD $742_R$ and an instance of the objectE $744_R$. In some cases, the virtual file system 186B at peerB $688_B$ can check that permissions allow for such a request.

A determination can then be made whether the requested object or objects exist at the source peer (see decision 706). For example, the object and/or portions (e.g., chunks) of the object may be located within a local cache at the source peer virtual file system due to the source peer having earlier requested the object from the cloud-based storage system. If the object exists at the source peer (see "Yes" path of decision 706), then the object can be transferred from the source peer to the destination peer (see operation 708). For example, the objectD $742_L$ at peerB $688_B$ can be transferred to peerA $688_A$ in a P2P object transfer 724. In some cases (e.g., slow P2P transfer conditions, administrative override, etc.), the objectD $742_R$ at the cloud-based storage system 110 might be selected for transfer even when the objectD $742_L$ exists at the peerB $688_B$. If the object is not located at the source peer or any other connected peer (see "No" path of decision 706), then the object can be retrieved from the cloud-based storage system 110 (see operation 710). For example, the objectE $744_R$ at the cloud-based storage system 110 can be transferred to peerA $688_A$ in a remote object transfer 726. As such, another peer (e.g., peerB $688_B$, peerC, etc.) might then be able to transfer the instance of objectE now stored locally at peerA $688_A$ from peerA $688_A$.

In some cases, the peer-to-peer connections can be among many peers. In such cases, various portions of the requested data might be transferred from multiple peers. For example, if peer1 requests a file, and peer2 and peer3 both have the file, peer1 might retrieve certain portions of the file from each peer based on various metrics such as the network conditions of peer2 and peer3.

There can many advantages to the approach of sharing data (e.g., metadata, object data, etc.) among peers implementing the herein disclosed virtual file system. As an example, internal network data transfers facilitated by such P2P connections are often faster than external network data transfers. In addition, this approach can reduce the bandwidth that the cloud-based storage system might need to expend to service data transfer requests. Further, usage of internet bandwidth for the enterprise may also be reduced, which can be expensive as compared to intranet and/or internal network bandwidth. Moreover, this approach allows peers (e.g., nodes, user devices, client devices, etc.) within a network to access files in the virtual file system, even if the peer is not connected to an external network.

FIG. 8 illustrates a concurrent write operation technique 800 implemented in a virtual file system in a cloud-based environment. As an option, one or more variations of concurrent write operation technique 800 or any aspect thereof may be implemented in the context of the architecture and functionality of the embodiments described herein. The concurrent write operation technique 800 or any aspect thereof may be implemented in any environment.

The herein disclosed techniques for implementing a virtual file system in a cloud-based environment can facilitate low latency access to objects and/or portions of objects updated by various collaborators (e.g., see FIG. 3). The concurrent write operation technique 800 illustrates one technique enabled by the herein disclosed techniques for providing such low latency access to objects and/or portions of objects. Specifically, the virtual file system $186_1$ can manage objects accessible by the virtual file system $186_1$ by using chunks that comprise the objects. For example, as shown, the virtual file system $186_1$ might partition an object 802 into various instances of chunks 804 to facilitate certain operations such as a save operation.

More specifically, one or more of the chunks 804 of the object 802 might be modified locally at a user device comprising the virtual file system $186_1$. In some cases, an object save operation at a later moment in time can be processed by the virtual file system $186_1$ to write at least the modified chunks from the chunks 804 to the local cache 214. According to the concurrent write operation technique 800, such a local write to the local cache 214 can be chunk-based such that a sequence of chunks can be written to the local cache 214 at times corresponding to a set of local chunk write times 806 (e.g., $t_{L0}, t_{L1}, t_{L2}, \ldots, t_{Ln}$). As an example, the local chunk write times 806 might correspond to a fast, synchronous write to the local cache 214.

The object save operation can further invoke a write to the storage devices 120 of the cloud-based storage system 110 by the virtual file system $186_1$. According to the concurrent write operation technique 800, such a remote write over the network 109 to the cloud-based storage system 110 can be chunk-based such that a sequence of chunks can be written to the storage devices 120 at times corresponding to a set of cloud chunk upload times 816 (e.g., $t_{C0}, t_{C1}, t_{C2}, \ldots, t_{Cm}$). In most cases, while time $t_{L0}$ and time $t_{C0}$ might be near one another, the remainder of the cloud chunk upload times 816 can be asynchronous to the local chunk write times 806. For example, the latency associated with writing the chunks across the network 109 to the cloud-based storage system 110 can be longer than writing to the local cache 214 of the user device. In certain embodiments, the virtual file system $186_1$ can facilitate such asynchronous operations (e.g., using a work queue in a cloud executor).

With a chunk-based upload approach, the concurrent write operation technique 800 can provide low latency access to the updated chunks by various groups of collaborators 121. Specifically, as certain updated chunks are written to the cloud-based storage system 110, the updated chunks can be immediately available to the collaborators 121 in an updated chunk access 818. For example, any of the collaborators 121 accessing an instance of the object 802 on a respective local user device can access any updated chunks written to the cloud-based storage system 110 by other collaborators without an entire updated instance of the object 802 being committed to the cloud-based storage system 110. A flowchart illustrating such a chunk-based write operation technique is shown and described as pertains to FIG. 9.

Figure 9:
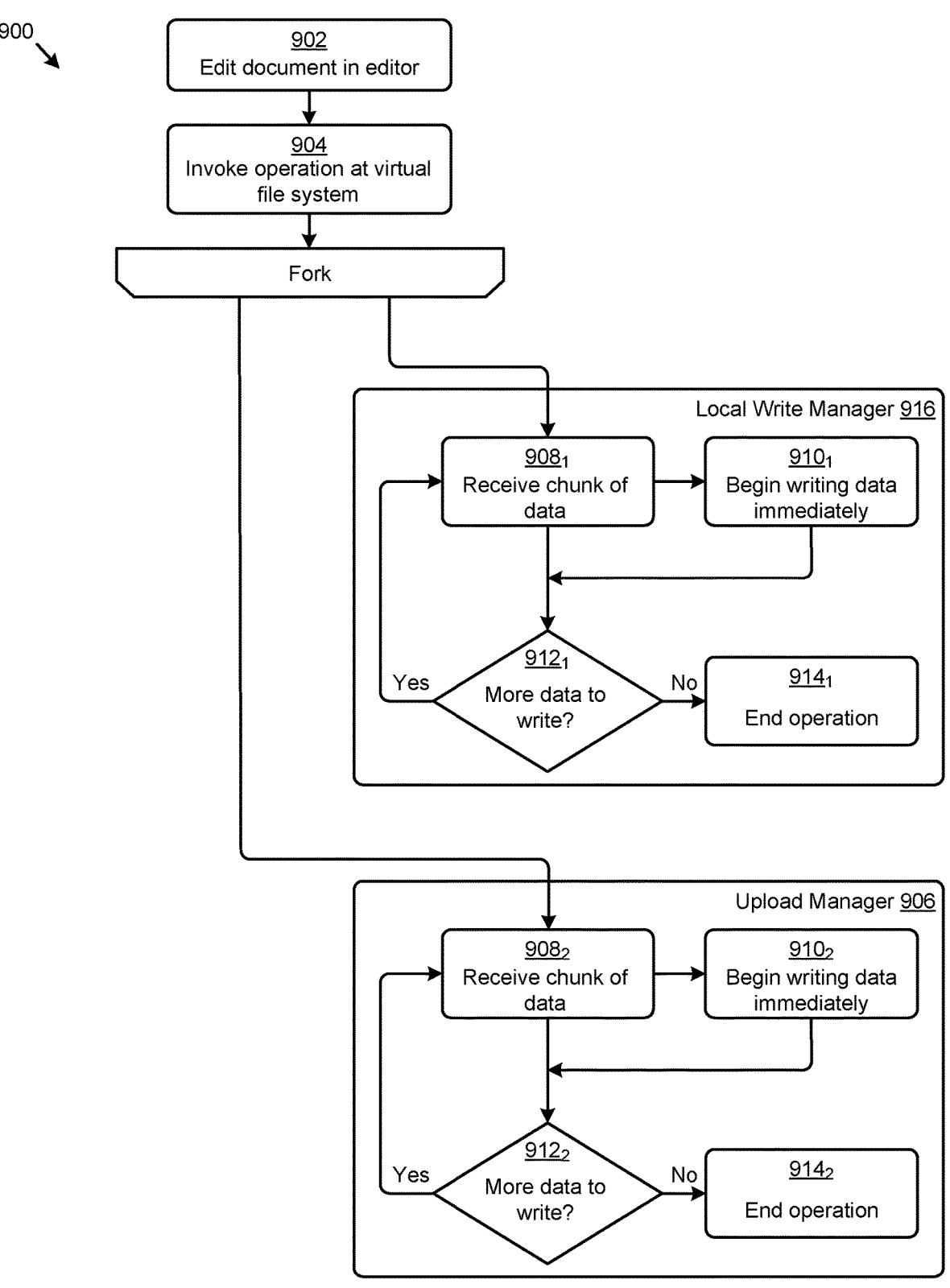
FIG. 9 is a flowchart illustrating a chunk-based write operation technique implemented in a virtual file system in a cloud-based environment, according to an embodiment.

FIG. 9 is a flowchart illustrating a chunk-based write operation technique 900 implemented in a virtual file system in a cloud-based environment. As an option, one or more variations of chunk-based write operation technique 900 or any aspect thereof may be implemented in the context of the architecture and functionality of the embodiments described herein. The chunk-based write operation technique 900 or any aspect thereof may be implemented in any environment.

Specifically, the chunk-based write operation technique 900 can commence with an object (e.g., file, document, etc.) being edited in an application that interacts with a virtual file system implemented according to the herein disclosed techniques (see operation 902). For example, a text file may undergo editing in a text editor, or a figure and/or an image may undergo editing by a drawing and/or image processing application, respectively. At a later moment in time, the application may invoke a certain operation (e.g., a "save" operation) at the virtual file system (see operation 904). For example, the operation might comprise issuing a call to the file system interface of the virtual file system.

According to the herein disclosed techniques, the call to the file system interface of the virtual file system might trigger certain operations at a local write manager 916 and/or an upload manager 906. For example, the local write manager 916 can manage writes to a local cache on a user device, and the upload manager 906 can manage uploads to a cloud-based storage system. As shown in the chunk-based write operation technique 900, at least some of the operations executed by the local write manager 916, and the upload manager 906 can correspond to a common set of high order functions. Specifically, the local write manager 916 and the upload manager 906 might receive one or more chunks of data pertaining to the object (e.g., file) to be saved (see operation 908₁ and operation 908₂).

Without waiting for the entire object (e.g., file) to be ready to be written and/or uploaded, the received chunk can be written (e.g., to the local cache) and/or uploaded (e.g., to the cloud-based storage system) (see operation 910₁ and operation 910₂). If more chunks are to be written and/or uploaded (see "Yes" path of decision 912₁ and decision 912₂), then a next chunk can be received (see operation 908₁ and operation 908₂). When all chunks have been written and/or uploaded (see "No" path of decision 912₁ and decision 912₂), then the save operation can end at the local write manager 916 and the upload manager 906 (see operation 914₁ and operation 914₂).

Any of the aforementioned operations can be implemented in the context of various implementations of a virtual file system. Strictly as examples, an application or "app" may be used to access files. Such applications or apps may comprises any native application (e.g., application programs and system utilities) that may exist in user space. In some cases applications or apps can operate in conjunction with, or can operate using functions performed from, within the operating system's kernel space.

For example, an application may perform a function call to access the file system (e.g., from a system library having a function to access a file or directory within the file system). Any suitable call can be issued by the application to perform read, write, or modify operations. The function call might be processed in user space, or might be processed in kernel space, or both, possibly using facilities of a file system driver that executes instructions located within the OS kernel. In some cases such a file system driver interfaces with an adapter layer to redirect calls to/from user space and kernel space. The adapter layer can be implemented as a kernel extension. Any suitable adapter layer can be employed. For example, the callback file system (CBFS), and/or the OSXFUSE product (FUSE stands for "filesystem in user-space") can be employed in various systems as the adapter layer.

The adapter layer will accept calls and redirect those calls to the virtual file system. The virtual file system will then handle the call by accessing the requested files in the cloud-based storage system (e.g., by calling an API associated with the cloud-based storage system).

The aforementioned chunk-based write operations can be performed with or without object locking. Determination as to when and how to use (or not use) object locking can be based on a set of rules that are used in conjunction with techniques to apply such rules over an object or operation.

FIG. 10 depicts an object locking technique 1000 facilitated by a virtual file system in a highly collaborative cloud-based environment. As an option, one or more variations of object locking technique 1000 or any aspect thereof may be implemented in the context of the architecture and functionality of the embodiments described herein. The object locking technique 1000 or any aspect thereof may be implemented in any environment.

The object locking technique 1000 can address certain object access conflicts that can occur when implementing a virtual file system in a highly collaborative cloud-based environment, according to the herein disclosed techniques. Specifically, the object locking technique 1000 can commence by establishing certain virtual file system locking rules (see operation 1002). For example, a set of object locking rules 1026 might be used to determine certain attributes (e.g., permissions attributes) of the object metadata 194 at the cloud-based storage system and/or the local metadata in a virtual file system at a user device. In some cases, the object locking rules 1026 can be applied in situations where an object (e.g., file) and/or a path might need to be locked to remediate issues (e.g., inconsistencies, conflicts, etc.) pertaining to access by multiple collaborators. For example, a first access to a given pathname might result in a locking of further accesses to that pathname, and/or its ancestor folders, based in part on the object locking rules 1026.

Specifically, according to the object locking technique 1000, a request can be received for an object (e.g., pathname request) (see operation 1004). A determination might then be made as to whether there are any applicable locking rules for the received request (see operation 1006). For example, the object metadata 194 might be scanned to discover whether there are any other entities that are already currently accessing the pathname. Based on the results of the scan, any pertinent rules from the object locking rules 1026 can be selected. The selected rules can then be processed (see operation 1008) and the results applied to the object metadata 194 and/or the local metadata 196 in the virtual file system. For example, certain permissions for the requester and/or other collaborators might be recorded in the foregoing metadata. In some cases, such permissions settings might further result in a visual indication that can be displayed at the user device by the local instance of the virtual file system, as illustrated in FIG. 11A and FIG. 11B.

Figure 11A:
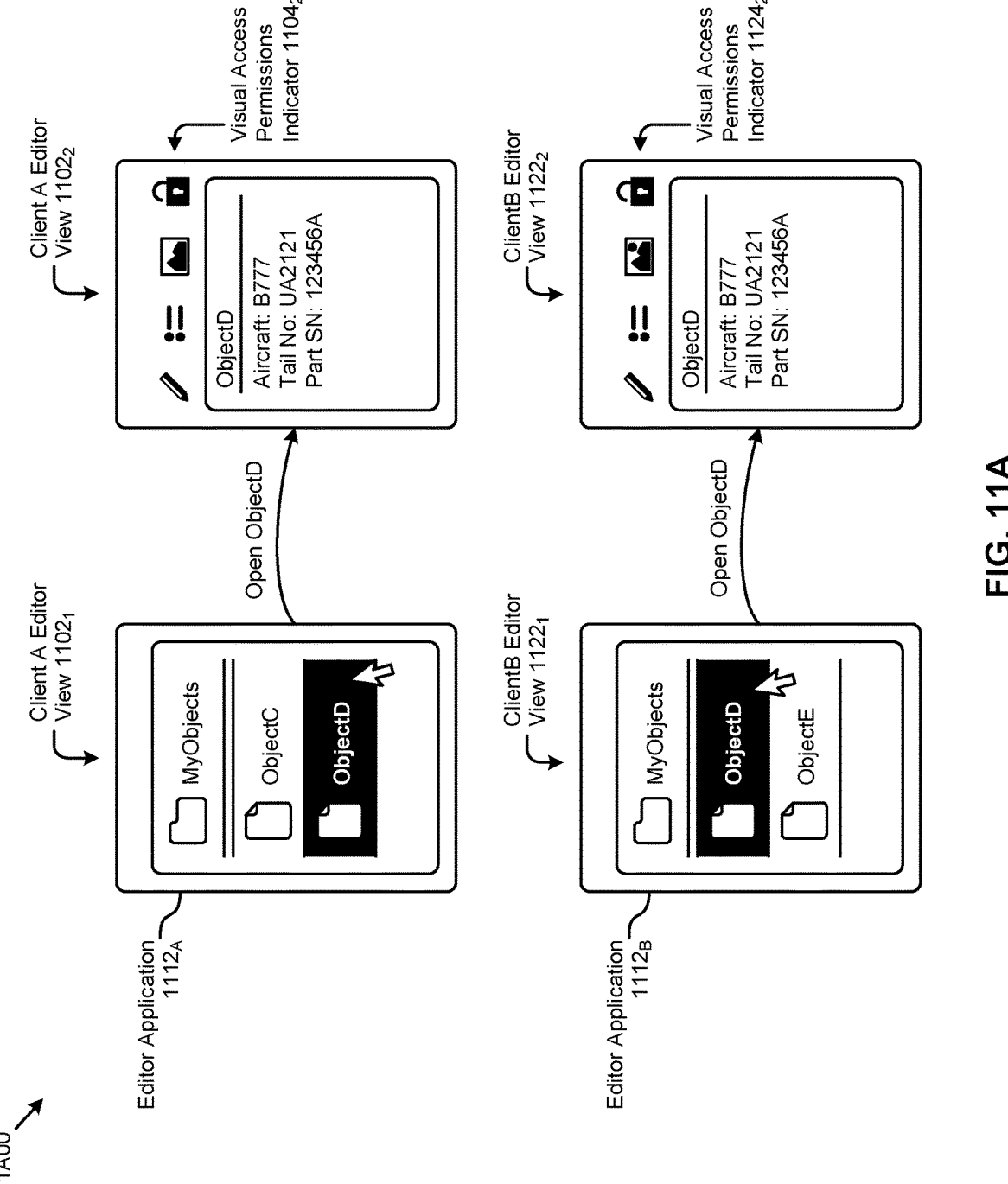
FIG. 11A illustrates an object viewing scenario facilitated by a virtual file system in a cloud-based environment, according to an embodiment.

FIG. 11A illustrates an object viewing scenario 11A00 facilitated by a virtual file system in a highly collaborative cloud-based environment. As an option, one or more variations of object viewing scenario 11A00 or any aspect thereof may be implemented in the context of the architecture and functionality of the embodiments described herein. The object viewing scenario 11A00 or any aspect thereof may be implemented in any environment.

Some embodiments of the herein disclosed techniques can provide a visual indication of file accessibility in a collaborative environment where multiple entities may seek to access a given file. As an example, two such entities, clientA and clientB, seek to access an objectD as shown in the object viewing scenario 11A00. Specifically, clientA and clientB are shown selecting the objectD using editor application 1112A and editor application $1112_B$, respectively, as shown in clientA editor view 11021 and clientB editor view 11221, respectively. Both clientA and clientB proceed to open the objectD as depicted in clientA editor view $1102_2$ and clientB editor view $1122_2$, respectively. Since both clientA and clientB are merely viewing the objectD at this point, the visual access permissions indicator $1104_2$ and the visual access permissions indicator $1124_2$ for clientA and clientB, respectively, indicate an "unlocked" permissions status. For example, the permissions attribute of the local metadata associated with clientA and clientB might each be set to "permissions=unlocked". In some cases, the presence of the visual access permissions indicators might indicate the opened object is accessed from the virtual file system. In other cases, the shown or equivalent visual access permissions indicators might further indicate there are no permissions issues, the internet is connected, and nobody else has locked the file. Any type of image for the visual access permissions indicators may be used in any embodiment.

Figure 11B:
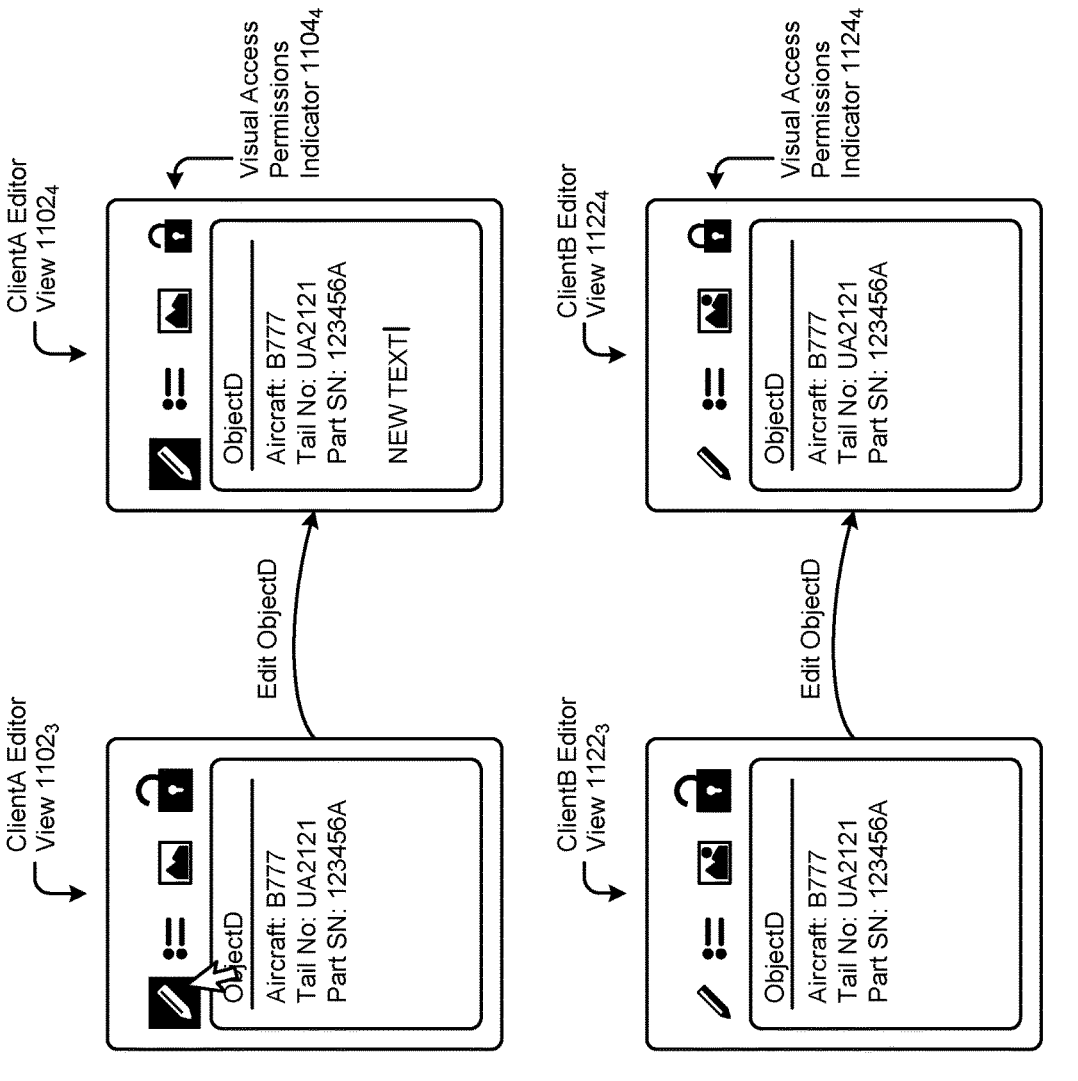
FIG. 11B illustrates an object locking scenario as implemented using a virtual file system in a cloud-based environment, according to an embodiment.

FIG. 11B illustrates an object locking scenario 11B00 as implemented using a virtual file system in a highly collaborative cloud-based environment. As an option, one or more variations of object locking scenario 11B00 or any aspect thereof may be implemented in the context of the architecture and functionality of the embodiments described herein. The object locking scenario 11B00 or any aspect thereof may be implemented in any environment.

Continuing from the object viewing scenario 11A00 of FIG. 11A, the object locking scenario 11B00 shows clientA interacting with the editor application to invoke the editing of objectD in clientA editor view $1102_3$. As shown in clientB editor view $1122_3$, clientB continues to merely view objectD. ClientA editor view $1102_3$ and clientB editor view $1122_3$ further indicate objectD is "unlocked" for editing. When clientA has edited objectD as shown in clientA editor view $1102_4$, the visual access permissions indicator $1124_4$ in clientB editor view $1122_4$ is changed to a "locked" symbol, while visual access permissions indicator $1104_4$ in clientA editor view $1122_3$ remains an "unlocked" symbol.

Such visual indications of collaborator activity can occur with low latency according to the herein disclosed techniques. For example, responsive to clientA opening objectD for editing, a call can be made by the virtual file system of clientA to the cloud-based storage system to update the object metadata to indicate clientA is editing objectD. Such object metadata updates can be immediately broadcast to all pertinent collaborators (e.g., clientB) to, for example, set the permissions attribute of the local metadata associated with clientB to "permissions=locked". The small amount of data characterizing the permissions attribute that might be required to facilitate the visual indications allows the low latency communication among collaborators. Further details pertaining to such visual display locking techniques are described in FIG. 12.

FIG. 12 depicts a visual lock display technique 1200 as facilitated by a virtual file system in a highly collaborative cloud-based environment. As an option, one or more variations of visual lock display technique 1200 or any aspect thereof may be implemented in the context of the architecture and functionality of the embodiments described herein. The visual lock display technique 1200 or any aspect thereof may be implemented in any environment.

Specifically, the visual lock display technique 1200 can commence with receiving a request to open a file (see operation 1202). For example, the file may be a file within a virtual file system that is backed by a cloud-based storage system. The file may further be collaboratively accessed by multiple entities. The file can then be opened (see operation 1204). For example, the file can be opened by a user using a certain editor such as a document editor (e.g., for documents), an image editor (e.g., for images), a spreadsheet editor (e.g., for spreadsheets), and/or any other type of interface that can be used to edit and/or change a file.

When the file is opened, a visual indicator can be displayed in the user interface of the editor (see operation 1206). In some cases, the visual indicator can be associated with a fixed location on the editor user interface such that the visual indicator can remain in the fixed location as the position of the user interface window changes. In some cases, the visual indicator may be changed based on the current state of the file (see operation 1208). For example, the visual indicator may have various representations based on whether the file is merely opened for reading, locked for local editing, or locked by others.

In some cases, such visual indicators can also indicate other attributes of the file such as the file is being uploaded, the file contains confidential information, and/or other attributes. Such visual indicators can also be extended to include more metadata about the file, information that is available for a file, or any other information that is maintained by a cloud-based storage system or the file (e.g., such as comments). Further, other techniques using a visual indicator can address any file data and/or metadata that could be of interest to the user.

ADDITIONAL EMBODIMENTS OF THE DISCLOSURE

Additional Practical Application Examples

FIG. 13A depicts a system 13A00 as an arrangement of computing modules that are interconnected so as to operate cooperatively to implement certain of the herein-disclosed embodiments. The partitioning of system 13A00 is merely illustrative and other partitions are possible. As an option, the system 13A00 may be implemented in the context of the architecture and functionality of the embodiments described herein. Of course, however, the system 13A00 or any operation therein may be carried out in any desired environment.

The system 13A00 comprises at least one processor and at least one memory, the memory serving to store program instructions corresponding to the operations of the system. As shown, an operation can be implemented in whole or in part using program instructions accessible by a module. The modules are connected to a communication path 13A05, and any operation can communicate with other operations over communication path 13A05. The modules of the system can, individually or in combination, perform method operations within system 13A00. Any operations performed within system 13A00 may be performed in any order unless as may be specified in the claims.

The shown embodiment implements a portion of a computer system, presented as system 13A00, comprising a computer processor to execute a set of program code instructions (see module 13A10) and modules for accessing memory to hold program code instructions to perform: configuring a server in a cloud-based environment to interface with one or more storage devices that store shared content accessible by two or more users, the shared content associated with object metadata stored in the cloud-based environment (see module 13A20); delivering a virtual file system module to two or more user devices associated with the two or more users for accessing the shared content, the virtual file system module serving to capture local metadata that pertains to at least one object from the shared content (see module 13A30); updating one or more local metadata attributes of the local metadata responsive to at least one local object operation invoked by at least one first user device from the user devices (see module 13A40); updating, in response to the local object operation, one or more object metadata attributes of the object metadata (see module 13A50); and delivering at least one of the one or more object metadata attributes to at least one second user device from the user devices (see module 13A60).

Variations of the foregoing may include more or fewer of the shown modules and variations may perform more or fewer (or different) steps, and/or may use data elements in more, or fewer, or different operations.

Strictly as examples, some variations include:

Variations that further comprise acts for receiving the object metadata attributes at the second user device prior to a completion of the local object operation.

Variations where updating the local metadata attributes and updating the object metadata attributes occur asynchronously.

Variations that further comprise acts for storing at least one updated object chunk in a local cache responsive to the local object operation, and acts for uploading the updated object chunk to the shared content of the cloud-based environment.

Variations that further comprise acts for receiving the updated object chunk by at least one second user device from the user devices prior to a completion of the local object operation.

Variations where storing the updated object chunk and uploading the updated object chunk occur asynchronously.

Variations that further comprise acts for establishing a peer-to-peer connection between the first user device and the second user device; and transferring at least one of, a portion of the object metadata, or a portion of a local object stored in a local cache, between the first user device and the second user device.

Variations that further comprise acts for displaying one or more visual access permissions indicators based at least in part on the object metadata attributes.

Variations that further comprise acts for determining at least one of, the local metadata attributes and/or the object metadata attributes, based at least in part on a set of object locking rules.

Variations where at least one permissions attribute is based at least in part on object locking rules.

FIG. 13B depicts a system 13B00 as an arrangement of computing modules that are interconnected so as to operate cooperatively to implement certain of the herein-disclosed embodiments. The partitioning of system 13B00 is merely illustrative and other partitions are possible. As an option, the system 13B00 may be implemented in the context of the architecture and functionality of the embodiments described herein. Of course, however, the system 13B00 or any operation therein may be carried out in any desired environment. The system 13B00 comprises at least one processor and at least one memory, the memory serving to store program instructions corresponding to the operations of the system. As shown, an operation can be implemented in whole or in part using program instructions accessible by a module. The modules are connected to a communication path 13B05, and any operation can communicate with other operations over communication path 13B05. The modules of the system can, individually or in combination, perform method operations within system 13B00. Any operations performed within system 13B00 may be performed in any order unless as may be specified in the claims. The shown embodiment implements a portion of a computer system, presented as system 13B00, comprising a computer processor to execute a set of program code instructions (see module 13B10) and modules for accessing memory to hold program code instructions to perform: implementing a file system interface between the cloud-based storage platform and a virtual file system, in which the file system interface directs file system calls from an application running on one of the user devices to the virtual file system (see module 13B20); processing at least some of the file system calls received at the file system interface through a first operation pipeline comprising a local data manager that issues one or more of the file system calls to a file system executor that performs local processing to produce a series of file events (see module 13B30); receiving a file event from the first pipeline and initiating processing of the file event through a second pipeline comprising at least a first operation to access local metadata corresponding to the file events and a second operation to access a local cache to identify a portion of a file within the virtual file system (see module 13B40); and providing at least an identification of contents of the local cache to a remote storage application programming interface to initiate a change in the file system of the cloud-based storage platform (see module 13B50).

System Architecture Overview

Additional System Architecture Examples

Figure 14A:
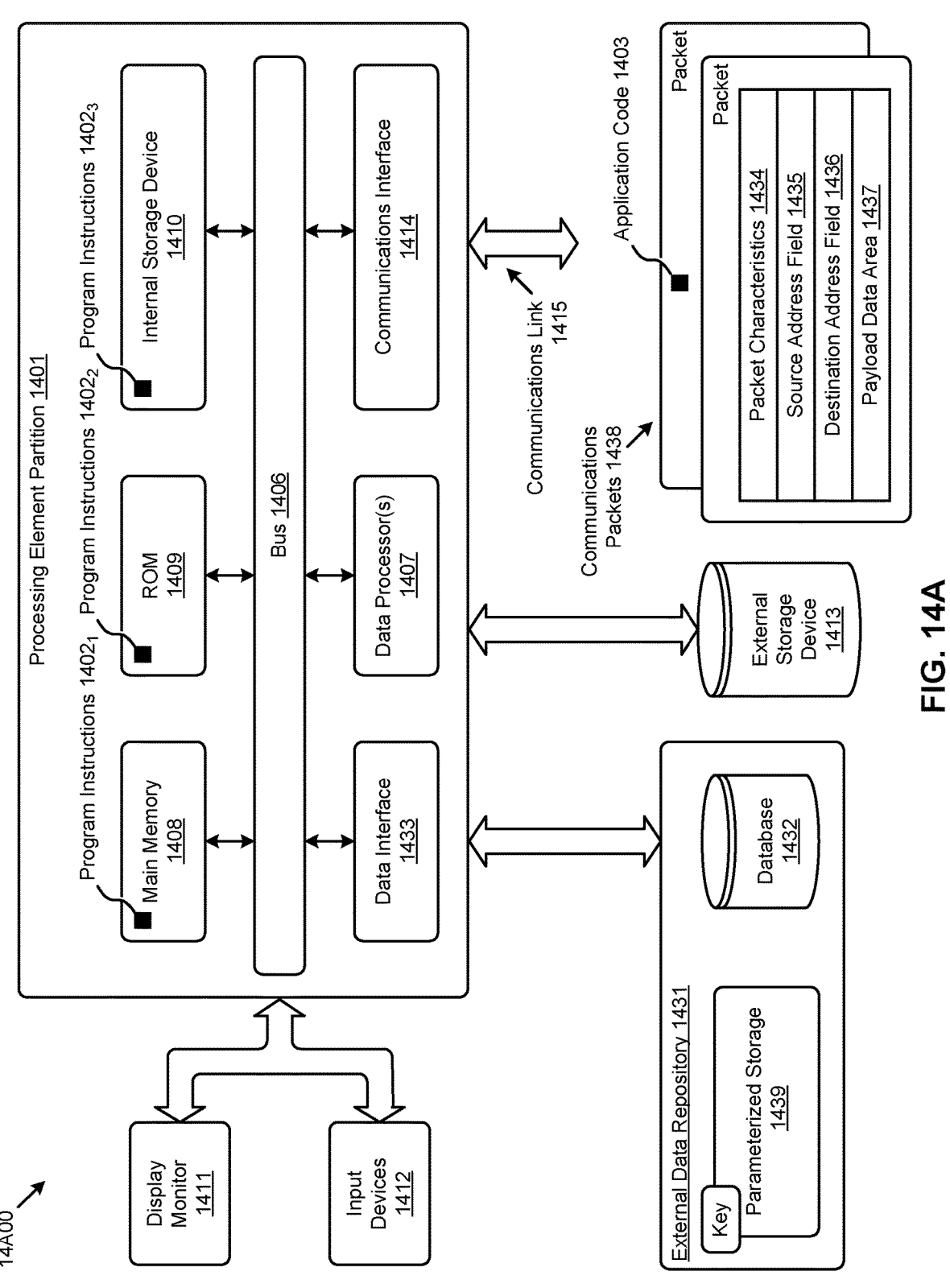
FIG. 14A and FIG. 14B present block diagrams of computer system architectures having components suitable for implementing embodiments of the present disclosure, and/or for use in the herein-described environments.

FIG. 14A depicts a block diagram of an instance of a computer system 14A00 suitable for implementing embodiments of the present disclosure. Computer system 14A00 includes a bus 1406 or other communication mechanism for communicating information. The bus interconnects subsystems and devices such as a central processing unit (CPU), or a multi-core CPU (e.g., data processor 1407), a system memory (e.g., main memory 1408, or an area of random access memory (RAM)), a non-volatile storage device or non-volatile storage area (e.g., read-only memory 1409), an internal storage device 1410 or external storage device 1413 (e.g., magnetic or optical), a data interface 1433, a communications interface 1414 (e.g., PHY, MAC, Ethernet interface, modem, etc.). The aforementioned components are shown within processing element partition 1401, however other partitions are possible. The shown computer system 14A00 further comprises a display 1411 (e.g., CRT or LCD), various input devices 1412 (e.g., keyboard, cursor control), and an external data repository 1431.

According to an embodiment of the disclosure, computer system 14A00 performs specific operations by data processor 1407 executing one or more sequences of one or more program code instructions contained in a memory. Such instructions (e.g., program instructions 14021, program instructions 1402₂, program instructions 1402₃, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 14A00 performs specific networking operations using one or more instances of communications interface 1414. Instances of the communications interface 1414 may comprise one or more networking ports that are configurable (e.g., pertaining to speed, protocol, physical layer characteristics, media access characteristics, etc.) and any particular instance of the communications interface 1414 or port thereto can be configured differently from any other particular instance. Portions of a communication protocol can be carried out in whole or in part by any instance of the communications interface 1414, and data (e.g., packets, data structures, bit fields, etc.) can be positioned in storage locations within communications interface 1414, or within system memory, and such data can be accessed (e.g., using random access addressing, or using direct memory access DMA, etc.) by devices such as data processor 1407.

The communications link 1415 can be configured to transmit (e.g., send, receive, signal, etc.) any types of communications packets 1438 comprising any organization of data items. The data items can comprise a payload data area 1437, a destination address 1436 (e.g., a destination IP address), a source address 1435 (e.g., a source IP address), and can include various encodings or formatting of bit fields to populate the shown packet characteristics 1434. In some cases the packet characteristics include a version identifier, a packet or payload length, a traffic class, a flow label, etc. In some cases the payload data area 1437 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1407 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1431, which in turn can be formatted into any one or more storage areas, and which can comprise parameterized storage 1439 accessible by a key (e.g., filename, table name, block address, offset address, etc.).

Execution of the sequences of instructions to practice certain embodiments of the disclosure are performed by a single instance of the computer system 14A00. According to certain embodiments of the disclosure, two or more instances of computer system 14A00 coupled by a communications link 1415 (e.g., LAN, PTSN, or wireless network) may perform the sequence of instructions required to practice embodiments of the disclosure using two or more instances of components of computer system 14A00.

The computer system 14A00 may transmit and receive messages such as data and/or instructions organized into a data structure (e.g., communications packets). The data structure can include program instructions (e.g., application code 1403), communicated through communications link 1415 and communications interface 1414. Received program code may be executed by data processor 1407 as it is received and/or stored in the shown storage device or in or upon any other non-volatile storage for later execution. Computer system 14A00 may communicate through a data interface 1433 to a database 1432 on an external data repository 1431. Data items in a database can be accessed using a primary key (e.g., a relational database primary key).

The processing element partition 1401 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1407. Some embodiments include one or more special-purpose hardware components (e.g., power control, logic, sensors, transducers, etc.). A module may include one or more state machines and/or combinational logic used to implement or facilitate the operational and/or performance characteristics of implementing a virtual file system for accessing cloud-based shared content.

Various implementations of the database 1432 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of a virtual file system for accessing cloud-based shared content). Such files or records can be brought into and/or stored in volatile or non-volatile memory.

Figure 14B:
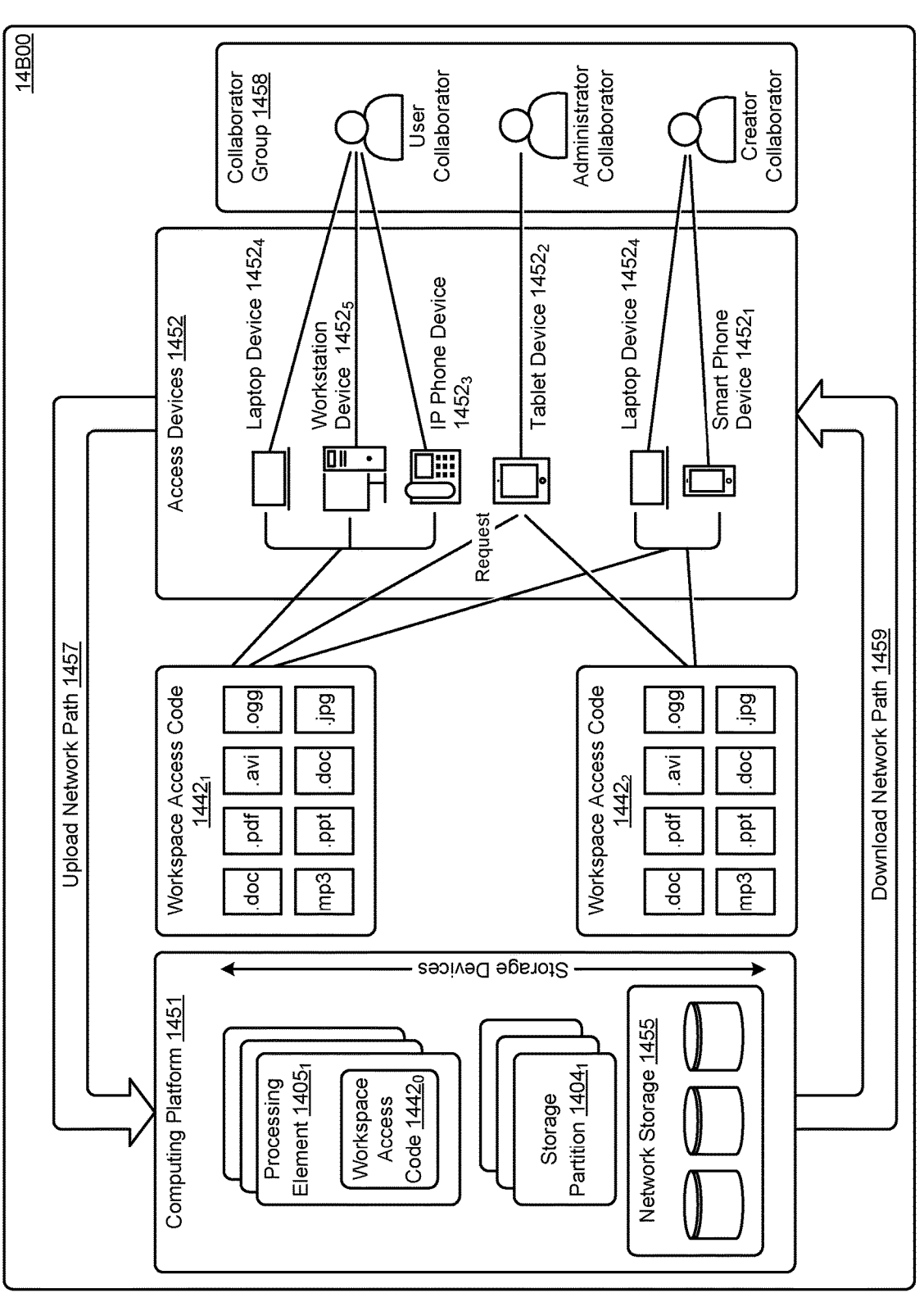

FIG. 14B depicts a block diagram of an instance of a cloud-based environment 14B00. Such a cloud-based environment supports access to workspaces through the execution of workspace access code (e.g., workspace access code 1442*o*, workspace access code 14421, and workspace access code 1442₂) Workspace access code can be executed on any of the shown access devices 1452 (e.g., laptop device 1452₄, workstation device 1452₅, IP phone device 1452₃, tablet device 1452₂, smart phone device 14521, etc.). A group of users can form a collaborator group 1458, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 1451, including in a middleware setting. As shown, a portion of the workspace access code resides in and can be executed on one or more processing elements (e.g., processing element 14051). The workspace access code can interface with storage devices such the shown networked storage 1455. Storage of workspaces and/or any constituent files or objects, and/or any other code or scripts or data can be stored in any one or more storage partitions (e.g., storage partition 14041). In some environments, a processing element includes forms of storage such as RAM and/or ROM and/or FLASH, and/or other forms of volatile and non-volatile storage.

A stored workspace can be populated via an upload (e.g., an upload from an access device to a processing element over an upload network path 1457). A stored workspace can be delivered to a particular user and/or shared with other particular users via a download (e.g., a download from a processing element to an access device over a download network path 1459).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method, comprising:
identifying a cloud-based storage system;
identifying a local client that is remote to the cloud-based storage system, the local client comprising both a native file system and a virtual file system, wherein local content corresponding to the local file system is stored at the local client and remote content corresponding to the virtual file system is stored at the cloud-based storage system;
maintaining local metadata that is local to the local client that represents the remote content stored at the cloud-based storage system; and
updating the local metadata in response to local operations at the local client, wherein the local metadata local to the local client is asynchronously reconciled by the cloud-based storage system.

2. The method of claim 1, further comprising:
tracking, by the cloud-based storage system, one or more respective local operations that are performed on a shared content object in a common workspace, wherein each of a plurality of local clients performs the one or more respective local operations in the common workspace that is maintained by the cloud-based storage system,
the one or more respective local operations are performed by the plurality of local clients asynchronously, and
the cloud-based storage system asynchronously reconciles multiple operations made by multiple local clients to an object stored at the cloud-based storage system.

3. The method of claim 1, further comprising:
provisioning low latency signaling of local operations performed by multiple local clients on a shared content object, wherein
low latency access is provided to the shared content object stored at the cloud-based storage system by the multiple local clients, and at least one of the multiple local clients is used to locally track the local operations using the local metadata.

4. The method of claim 1, further comprising:
receiving, at the local client, a function call to access a file or a directory from a native application in the local client;
receiving the function call at a layer using at least a file system driver;
redirecting, by an adapter layer, the function call to the virtual file system in the local client; and
servicing, by the virtual file system, the function call from the native application at least by calling the cloud-based storage system to access the file or the directory from the cloud-based storage system, wherein
collaborative access is provided to an object stored at the cloud-based storage system by multiple collaborators at multiple local clients, and at least one of the multiple local clients is used to locally track the local operations using the local metadata.

5. The method of claim 1, further comprising:
receiving, at the local client, a request for processing a file or directory in the virtual file system;
effecting a local change to the file or directory in the virtual file system, without waiting for a commit at the cloud-based storage system;
updating the local metadata to reflect the local change to the file or directory, without waiting for the commit at the cloud-based storage system;
performing an act of committing the local change to the cloud-based storage system asynchronously to the local change effected to the file or directory in the virtual file system; and
in response to the act of committing the local change to the cloud-based storage system, modifying remote view metadata in the virtual file system at the local client, wherein an object stored at the cloud-based storage system is opened by both a first user at a first local client and a second user at a second local client, where the first user is not made aware of an editing operation currently being made by the second user.

6. The method of claim 5, further comprising:
listening, at a different local client of a second user, for one or more events pertaining a separate file system in the different local client;
receiving, at the different local client, an event corresponding to committing the local change to the cloud-based storage system, wherein the local change is effected to the file or directory by the request received at the local client; and determining, by the different local client, how the event relates to a local view of the separate file system in the different local client, wherein after the second user saves edits made to the object, the first user is provided access to an updated version of the object.

7. The method of claim 1, wherein the virtual file system comprises an interface that emulates the native file system of the local client, the virtual file system modifies locally maintained data and local metadata at least by managing a first processing path and coordinates a request pertaining to a change that needs to be made in the cloud-based storage system at least by managing a second processing path, and multiple virtual file systems are mounted on the local client.

8. A non-transitory computer readable medium having stored thereon a sequence of instructions which, when stored in memory and executed by a microprocessor causes the microprocessor to perform a set of acts comprising:

identifying a cloud-based storage system;

identifying a local client that is remote to the cloud-based storage system, the local client comprising both a native file system and a virtual file system, wherein local content corresponding to the local file system is stored at the local client and remote content corresponding to the virtual file system is stored at the cloud-based storage system;

maintaining local metadata that is local to the local client that represents the remote content stored at the cloud-based storage system; and updating the local metadata in response to local operations at the local client, wherein the local metadata local to the local client is asynchronously reconciled by the cloud-based storage system.

9. The computer readable medium of claim 8, the set of acts further comprising:

tracking, by the cloud-based storage system, one or more respective local operations that are performed on a shared content object in a common workspace, wherein each of a plurality of local clients performs the one or more respective local operations in the common workspace that is maintained by the cloud-based storage system, the one or more respective local operations are performed by the plurality of local clients asynchronously, and the cloud-based storage system asynchronously reconciles multiple operations made by multiple local clients to an object stored at the cloud-based storage system.

10. The computer readable medium of claim 8, the set of acts further comprising:

provisioning low latency signaling of local operations performed by multiple local clients on a shared content object, wherein low latency access is provided to the shared content object stored at the cloud-based storage system by the multiple local clients, at least one of the multiple local clients is used to locally track the local operations using the local metadata.

11. The computer readable medium of claim 8, the set of acts further comprising:

receiving, at the local client, a function call to access a file or a directory from a native application in the local client;

receiving the function call at a layer using at least a file system driver;

redirecting, by an adapter layer, the function call to the virtual file system in the local client; and servicing, by the virtual file system, the function call from the native application at least by calling the cloud-based storage system to access the file or the directory from the cloud-based storage system, wherein collaborative access is provided to an object stored at the cloud-based storage system by multiple collaborators at multiple local clients, and at least one of the multiple local clients is used to locally track the local operations using the local metadata.

12. The computer readable medium of claim 8, the set of acts further comprising:

receiving, at the local client, a request for processing a file or directory in the virtual file system;

effecting a local change to the file or directory in the virtual file system, without waiting for a commit at the cloud-based storage system;

updating the local metadata to reflect the local change to the file or directory, without waiting for the commit at the cloud-based storage system;

committing the local change to the cloud-based storage system asynchronously to the local change effected to the file or directory in the virtual file system; and in response to committing the local change to the cloud-based storage system, modifying remote view metadata in the virtual file system at the local client, wherein an object stored at the cloud-based storage system is opened by both a first user at a first local client and a second user at a second local client, where the first user is not made aware of an editing operation currently being made by the second user.

13. The computer readable medium of claim 12, the set of acts further comprising:

listening, at a different local client of a second user, for one or more events pertaining a separate file system in the different local client;

receiving, at the different local client, an event corresponding to committing the local change to the cloud-based storage system, wherein the local change is effected to the file or directory by the request received at the local client; and determining, by the different local client, how the event relates to a local view of the separate file system in the different local client, wherein after the second user saves edits made to the object, the first user is provided access to an updated version of the object.

14. The computer readable medium of claim 8, wherein the virtual file system comprises an interface that emulates the native file system of the local client, the virtual file system modifies locally maintained data and local metadata at least by managing a first processing path and coordinates a request pertaining to a change that needs to be made in the cloud-based storage system at least by managing a second processing path, and multiple virtual file systems are mounted on the local client.

15. The system of claim 14, the set of acts further comprising:

tracking, by the cloud-based storage system, one or more respective local operations that are performed on a shared content object in a common workspace, wherein each of a plurality of local clients performs the one or more respective local operations in the common workspace that is maintained by the cloud-based storage system, the one or more respective local operations are performed by the plurality of local clients asynchronously, and the cloud-based storage system asynchronously reconciles multiple operations made by multiple local clients to an object stored at the cloud-based storage system.

16. The system of claim 14, the set of acts further comprising:

provisioning low latency signaling of local operations performed by multiple local clients on a shared content object, wherein low latency access is provided to the shared content object stored at the cloud-based storage system by the multiple local clients, and at least one of the multiple local clients is used to locally track the local operations using the local metadata.

17. The system of claim 14, the set of acts further comprising:

receiving, at the local client, a function call to access a file or a directory from a native application in the local client;

receiving the function call at a layer using at least a file system driver;

redirecting, by an adapter layer, the function call to the virtual file system in the local client; and servicing, by the virtual file system, the function call from the native application at least by calling the cloud-based storage system to access the file or the directory from the cloud-based storage system, wherein collaborative access is provided to an object stored at the cloud-based storage system by multiple collaborators at multiple local clients, and at least one of the multiple local clients is used to locally track the local operations using the local metadata.

18. The system of claim 14, the set of acts further comprising:

receiving, at the local client, a request for processing a file or directory in the virtual file system;

effecting a local change to the file or directory in the virtual file system, without waiting for a commit at the cloud-based storage system;

updating the local metadata to reflect the local change to the file or directory, without waiting for a commit at the cloud-based storage system;

committing the local change to the cloud-based storage system asynchronously to the local change effected to the file or directory in the virtual file system; and in response to committing the local change to the cloud-based storage system, modifying remote view metadata in the virtual file system at the local client, wherein an object stored at the cloud-based storage system is opened by both a first user at a first local client and a second user at a second local client, where the first user is not made aware of an editing operation currently being made by the second user.

19. The system of claim 14, the set of acts further comprising:

listening, at a different local client of a second user, for one or more events pertaining a separate file system in the different local client;

receiving, at the different local client, an event corresponding to committing the local change to the cloud-based storage system, wherein the local change is effected to the file or directory by the request received at the local client; and determining, by the different local client, how the event relates to a local view of the separate file system in the different local client, wherein the virtual file system comprises an interface that emulates the native file system of the local client, the virtual file system modifies locally maintained data and local metadata at least by managing a first processing path and coordinates a request pertaining to a change that needs to be made in the cloud-based storage system at least by managing a second processing path, and multiple virtual file systems are mounted on the local client.

20. A system, comprising:

a non-transitory storage medium having stored thereon a sequence of instructions; and a processor or processors that execute the sequence of instructions to cause the processor or processors to perform a set of acts, the set of acts comprising:

identifying a cloud-based storage system;

identifying a local client that is remote to the cloud-based storage system, the local client comprising both a native file system and a virtual file system, wherein local content corresponding to the local file system is stored at the local client and remote content corresponding to the virtual file system is stored at the cloud-based storage system;

maintaining local metadata that is local to the local client that represents the remote content stored at the cloud-based storage system; and updating the local metadata in response to local operations at the local client, wherein the local metadata local to the local client is asynchronously reconciled by the cloud-based storage system.

* * * * *